US009462543B2

(12) United States Patent
Ramkumar et al.

(10) Patent No.: US 9,462,543 B2
(45) Date of Patent: *Oct. 4, 2016

(54) METHOD AND SYSTEM FOR OPERATING MULTI-SUBSCRIBER IDENTITY MODULE (SIM) MOBILE DEVICE IN WIRELESS COMMUNICATION NETWORKS

(71) Applicant: Samsung Electronics Co., Ltd., Suwon-si, Gyeonggi-do (KR)

(72) Inventors: Thirumalli Sureshsah Ramkumar, Bangalore (IN); Diwakar Sharma, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/549,039

(22) Filed: Nov. 20, 2014

(65) Prior Publication Data

US 2015/0141012 A1 May 21, 2015

(30) Foreign Application Priority Data

Nov. 20, 2013 (IN) .......................... 5356/CHE/2013
Nov. 10, 2014 (IN) .......................... 5356/CHE/2013

(51) Int. Cl.

*H04B 1/3816* (2015.01)
*H04W 48/20* (2009.01)
*H04W 52/02* (2009.01)
*H04W 8/18* (2009.01)

(52) U.S. Cl.

CPC .......... *H04W 48/20* (2013.01); *H04B 1/3816* (2013.01); *H04W 52/0209* (2013.01); *H04W 8/183* (2013.01)

(58) Field of Classification Search

CPC ... H04W 48/16; H04W 48/18; H04W 48/20; H04W 52/0209; H04W 8/183; H04W 24/00; H04W 88/06; H04W 52/0241; H04B 1/3816; H05W 52/02

USPC ......... 455/434, 435, 435.3, 525, 432.1, 558, 455/575.7

See application file for complete search history.

(56) References Cited

U.S. PATENT DOCUMENTS

2006/0160537 A1* 7/2006 Buckley ............... H04W 48/18 455/435.2
2012/0264425 A1* 10/2012 Krishnamoorthy ... H04W 48/16 455/434
2013/0005394 A1* 1/2013 Geary ................ H04W 52/028 455/552.1

* cited by examiner

*Primary Examiner* — Kamran Afshar
*Assistant Examiner* — Farid Seyedvosoghi
(74) *Attorney, Agent, or Firm* — Jefferson IP Law, LLP

(57) ABSTRACT

The various embodiments herein provide a method and system for operating a multi-subscriber identity module (SIM) mobile device. The method includes identifying a common suitable public land mobile network (PLMN) cell between a first radio frequency (RF) unit and a second RF unit of the mobile device. The first RF unit and the second RF unit of the mobile device are currently camped on different PLMN cells. Further, the method includes enforcing at least one of the first RF unit and the second RF unit to camp on said common suitable PLMN cell and disabling one of the first RF unit and the second RF unit when at least one of the first RF unit and the second RF unit camps on the common suitable PLMN cell.

39 Claims, 26 Drawing Sheets

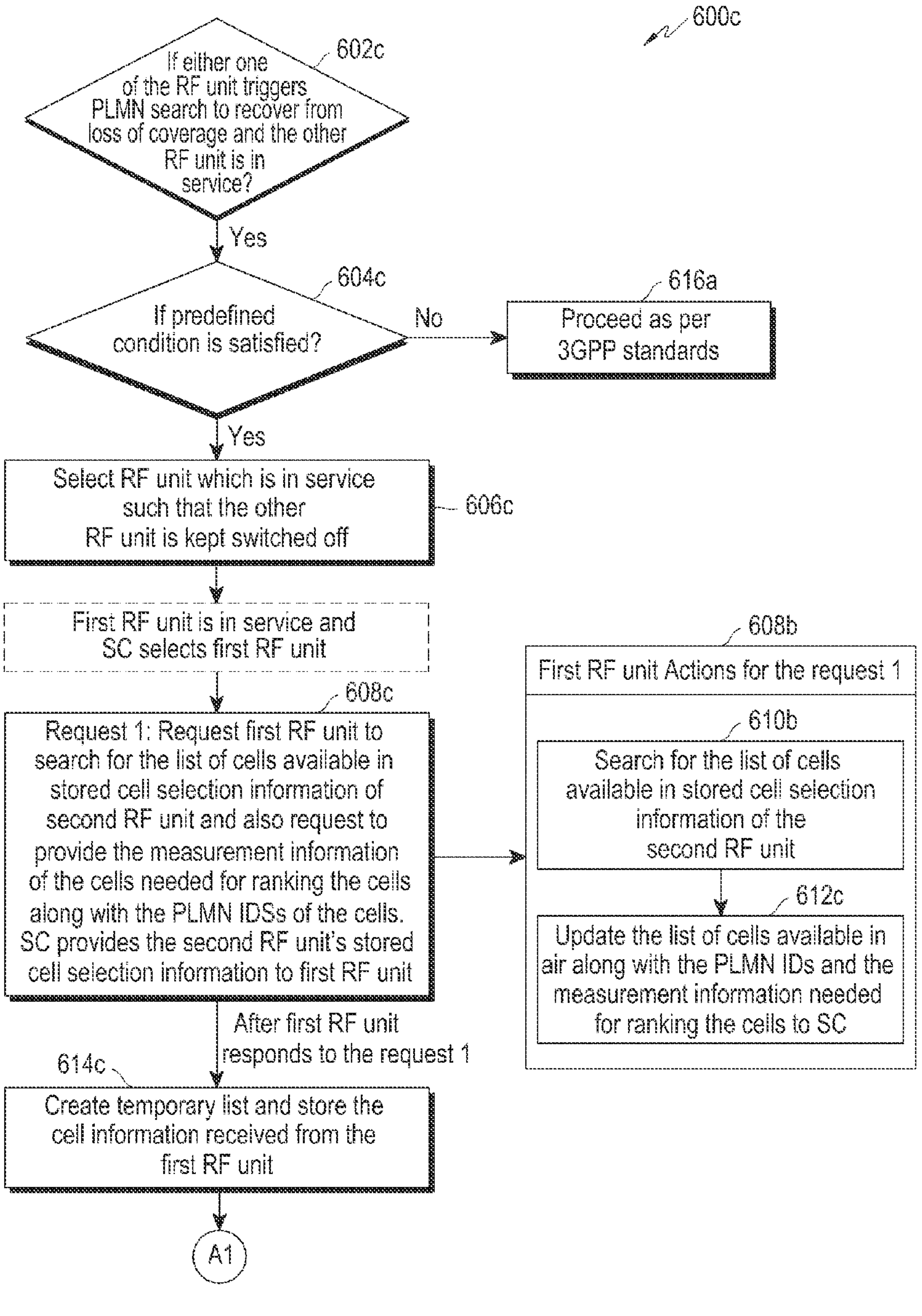
FIG.6C(CONTD)

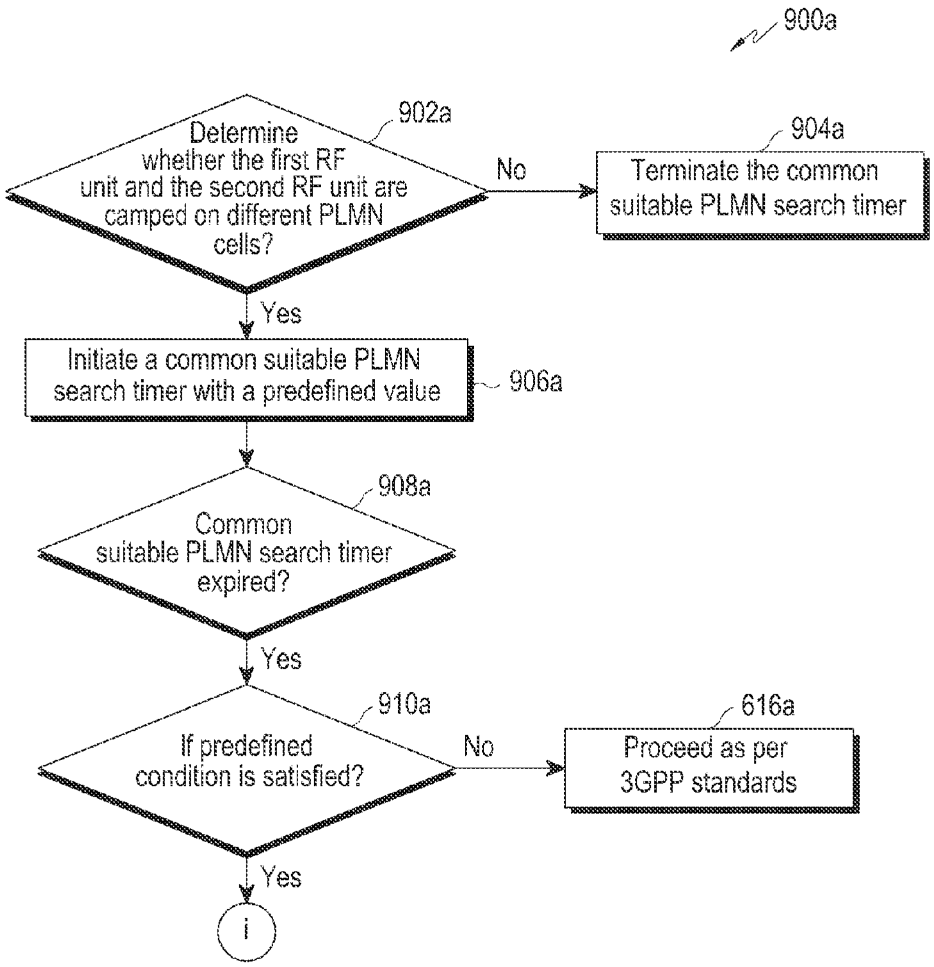
FIG.9A(CONTD)

METHOD AND SYSTEM FOR OPERATING MULTI-SUBSCRIBER IDENTITY MODULE (SIM) MOBILE DEVICE IN WIRELESS COMMUNICATION NETWORKS

PRIORITY

This application claims priority under 35 U.S.C. §119(a) to Indian Provisional Patent Application Serial No. 5356/CHE/2013, which was filed in the Indian Intellectual Property Office on Nov. 20, 2013, and Indian Complete Patent Application Serial No. 5356/CHE/2013, which was filed in the Indian Intellectual Property Office on Nov. 10, 2014, the entire contents of which are incorporated herein by reference.

BACKGROUND OF THE INVENTION

1. Field of the Invention

The present invention relates to wireless communication system and more particularly relates to a method and system for operating a multi-Subscriber Identity Module (SIM) mobile device in wireless communication networks.

2. Description of the Related Art

Advances in mobile communication technology have enabled users to use various types of mobile devices such as dual-mode mobile devices, multi-standby mobile devices and multi-SIM mobile devices. A dual-mode mobile device may use one of two SIM cards according to a user selection. Multi-standby mobile devices enable multiple subscriber identification cards active simultaneously for calls. A multi-SIM mobile device includes a radio frequency unit and a baseband chip, and multiple subscriber identification cards.

Generally, most of the users prefer using a multi-SIM mobile device as it enables the users to switch between network providers as and when required. For example, a first SIM may be camped on operator A and a second SIM may be camped on operator B where operator A and operator B corresponds to different network providers. Hence, the users on the multi-SIM mobile device can switch between these two operators as and when required.

A multi-SIM mobile device comprises of at least two radio frequency (RF) transceivers each working for a different network operator respectively. When the multi-SIM mobile device is located in a region where there is network coverage of at least two network operators associated with each of the two RF transceiver, both the RF transceivers are camped on different Public Land Mobile Network (HPLMN) cells which are the best suitable cell for the respective RF transceivers. In this scenario, the two RF transceivers always remain active for the complete duration in idle mode and connected mode. In particular, when a user is on a call on a first RF transceiver associated with the first SIM, a second RF transceiver remains active due to which the user constantly receives calls on the second SIM through the second RF transceiver. This results in drain of the battery since both the RF transceivers constantly remain active for the complete duration of a battery power cycle.

SUMMARY OF THE INVENTION

The objective of the present invention is to provide a method and system for operating a multi-Subscriber Identity Module (SIM) mobile device in wireless communication networks by forcing one of a protocol stack or both the protocol stacks to move to its Equivalent Public Land Mobile Network (EPLMN) cell.

Accordingly the embodiments herein provide a method and system for operating a multi subscriber identity module (SIM) mobile device. The method includes identifying a common suitable Public Land Mobile Network (PLMN) cell between a first radio frequency (RF) unit and a second RF unit of the mobile device. The first RF unit and the second RF unit of the mobile device are currently camped on different PLMN cells. Further, the method includes enforcing at least one of the first RF unit and the second RF unit to camp on the common suitable PLMN cell. Furthermore, the method includes disabling one of the first RF unit and the second RF unit when at both the first RF unit and the second RF unit camps on the common suitable PLMN cell.

The foregoing has outlined, in general, the various aspects of the invention and is to serve as an aid to better understanding the more complete detailed description which is to follow. In reference to such, there is to be a clear understanding that the present invention is not limited to the method or application of use described and illustrated herein. It is intended that any other advantages and objects of the present invention that become apparent or obvious from the detailed description or illustrations contained herein are within the scope of the present invention.

BRIEF DESCRIPTION OF THE DRAWINGS

The other objects, features and advantages will occur to those skilled in the art from the following description of the preferred embodiment and the accompanying drawings in which.

DETAILED DESCRIPTION OF EMBODIMENTS OF THE PRESENT INVENTION

Figure 1A:
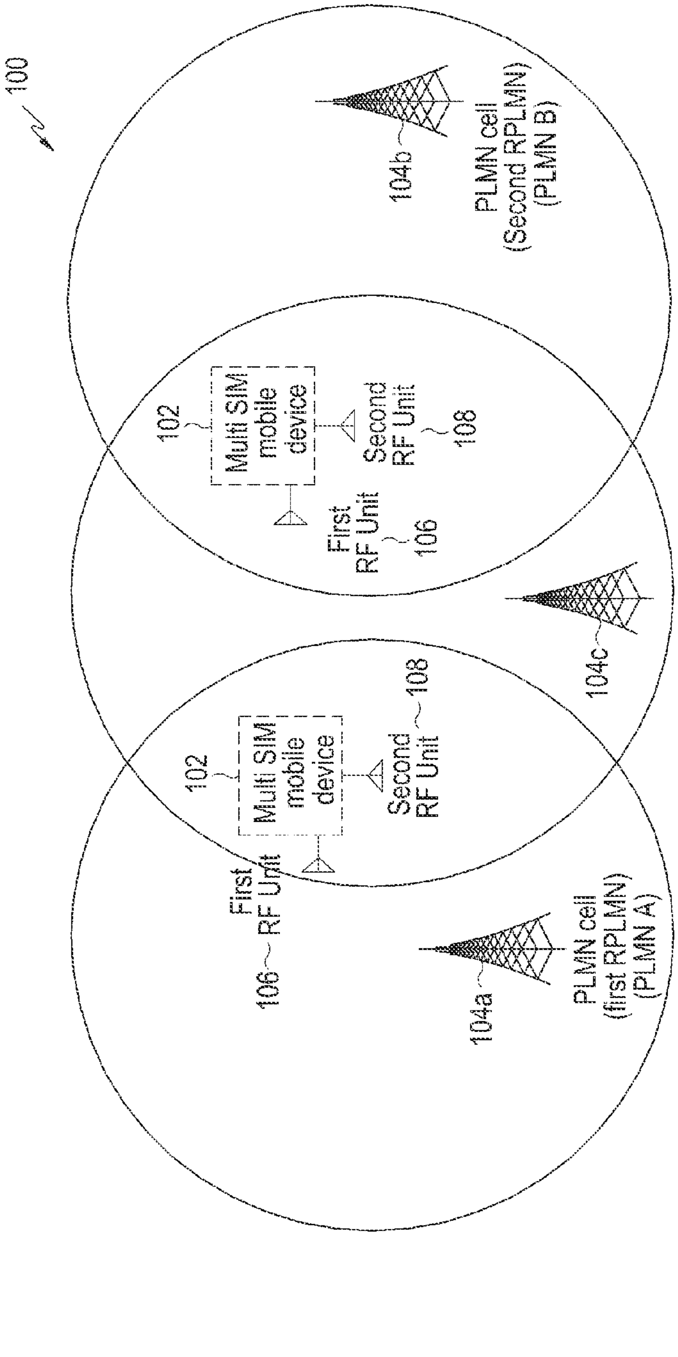
FIGS. 1A-1B illustrates an overview of a wireless communication system with a multi-Subscriber Identity Module (SIM) mobile device within coverage area of one or more Public Land Mobile Networks (PLMNs), according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein achieve a method and system for operating a multi-Subscriber Identity Module (SIM) mobile device (multi-SIM active mobile device) to optimize power consumption.

The method is described with reference to the multi-SIM active mobile device that typically includes dual SIMs. The dual SIMs include a first SIM associated with a first Radio Frequency (RF) unit and a second SIM associated with a second RF unit. In an example embodiment, the RF unit includes a transceiver. The dual SIM active mobile device is a typical example and not a limitation. The method can be extended to multiple SIMs associated with multiple RF units.

Throughout the description, the term first SIM may also refer to SIM A and the term second SIM may also refer to SIM B.

According to an embodiment of the present invention, when both the SIMs and their respective RF units of the dual SIM active mobile devices remain active, the method enables the multi-SIM mobile device to efficiently utilize the first RF unit and the second RF unit in order to save power of the multi SIM mobile device by consequently enabling and disabling the RF units (typically when the first SIM (a first SIM card) and the second SIM (a second SIM card) are provided by different PLMN operators.

The present invention provides a Stack Coordinator (SC) module associated with a SC database. The SC module manages requests to the first SIM and the second SIM for enabling or disabling their associated RF units (the first RF unit and the second RF unit). The SC module requests the SIM associated with the enabled RF unit to perform multi-tasking by exchanging required information with the PLMN for both the first SIM and the second SIM. Thus, this enables to save the power consumed by the currently disabled SIM. The coordination between the first SIM and the second SIM for enabling-disabling the RF units or sharing of the information received by either of the RF units is managed by the SC module by maintaining the information and status of each of the first SIM and the second SIM in the SC database. The SC module coordinates the actions of the first SIM and the second SIM during blind cell and stored cell selection procedure. Further, the SC module helps in random selection of a SIM for performing any action. The SC module also validates a PLMN cell whether the PLMN cell falls under custom defined limits. Additionally, the SC module is involved in managing a common suitable PLMN search timer. The method defines mechanisms for camping, registration, sharing of system information and paging information and handling of HPPLMN timers that efficiently utilize the RF transceivers and effectively reduce power consumption in the multi-SIM mobile device.

The method defines the behavior of the multi-SIM mobile device in the plurality of situations so as reduce power consumption. In an embodiment, one or more PLMNs in the wireless network can be a Home PLMN (HPLMN), an Equivalent PLMN (EPLMN), and a Registered PLMN (RPLMN) and so on for the first SIM and the second SIM.

In an embodiment, the multi-SIM mobile device can be a mobile phone, a tablet, a Personal Digital Assistant (PDA), a laptop, a palm top or any other communication device capable of supporting dual-SIM functionality.

In an embodiment, the wireless network includes but not limited to a Global System for Mobile Communications (GSM), a UMTS Terrestrial Radio Access (UTRA) services and an evolved UMTS Terrestrial Radio Access (EUTRA) services provided by a plurality of PLMN operators.

In order to receive an incoming call/SMS the mobile communication device such as the multi-SIM mobile device should be listening to a paging channel in its idle state (idle mode). In a cell, single or multiple paging channels may be established.

A multi SIM mobile device toggles between no-service and in-service modes depending on coverage status of their respective home network operators and area in which the multi-SIM mobile device is located. Usually, some of the home network operators have an agreement with other network operators in order to provide service for the any mobile device when the home network operators are unavailable. These operators with which the home network operator has an agreement are referred as Equivalent PLMN (EPLMN) cells. The multi-SIM mobile device identifies the EPLMN cells upon completing registration procedure from the home network operators in an EPLMN list. The EPLMN list is stored in flash memory of the multi-SIM mobile device and is not deleted even when the multi-SIM mobile device is switched off. For the multi-SIM mobile device, there exist as many EPLMN lists as that of number of SIM cards in the multi-SIM mobile device. For example, for a dual SIM mobile device, there exist two EPLMN lists corresponding to each of the SIM cards of the dual SIM mobile device. Each of the EPLMN list contains a plurality of target PLMN cells onto which corresponding SIM card of the multi-SIM mobile device can camp and register.

Embodiments herein describe plurality of situations that the multi-SIM mobile device experiences in the wireless network when the multi-SIM mobile device receives coverage from one or more PLMNs.

Referring now to the drawings, and more particularly to FIGS. 1 through 17, where similar reference characters denote corresponding features consistently throughout the FIGs, there are shown preferred embodiments.

Figure 1B:
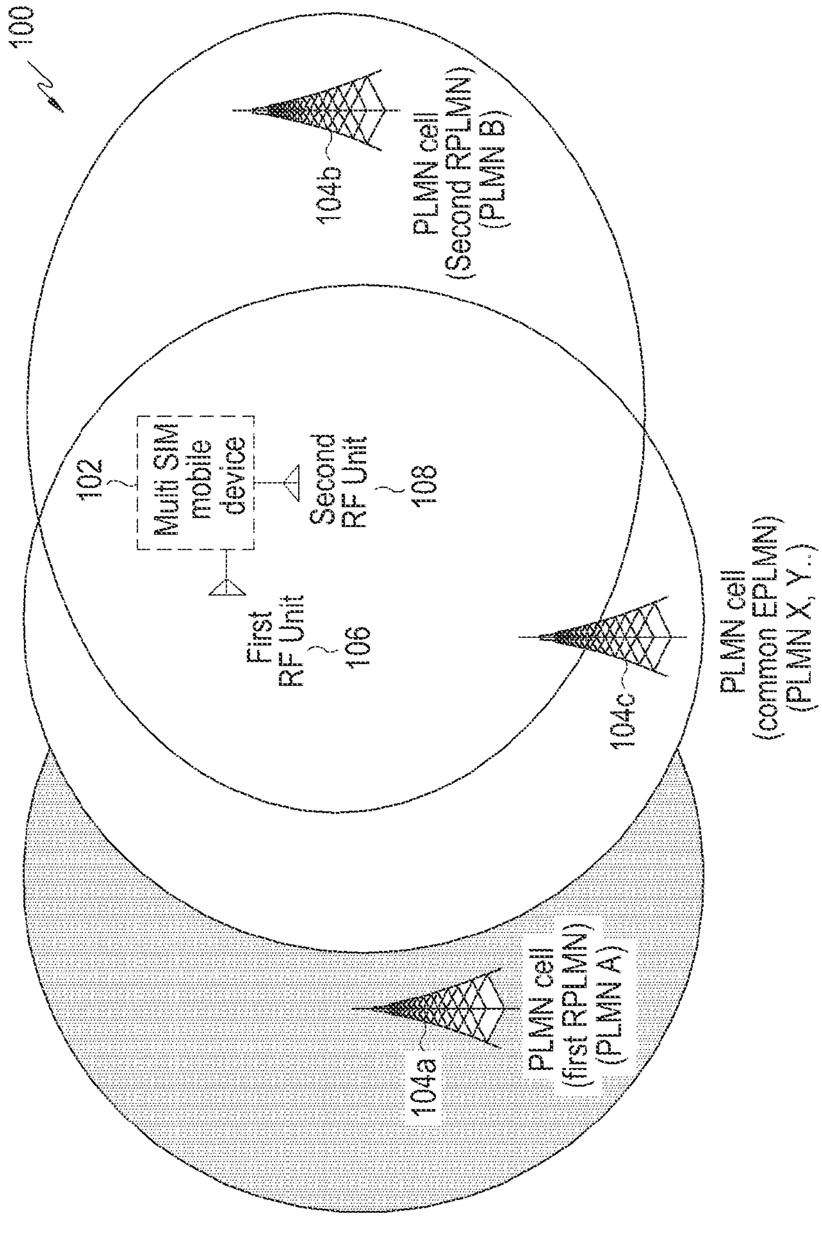

FIGS. 1A-1B illustrate an overview of a wireless communication system with a multi-Subscriber Identity Module (SIM) mobile device within coverage area of one or more Public Land Mobile Networks (PLMNs), according to embodiments as disclosed herein. The FIG. 1A depicts the wireless network 100 that includes a plurality of PLMNs provided by a plurality of network operators (PLMN operators). Specifically, the FIG. 1A depicts only PLMN 104*a*, PLMN 104*b* and PLMN 104*c*. Each of the PLMN 104*a*, PLMN 104*b* and PLMN 104*c* are capable of providing service to a multi-SIM mobile device 102. Each PLMNs comprises a plurality of cells associated with them. For example, PLMN 104*a* comprises cell A1, A2, A3 and so on which are associated with operator A. The PLMN 104*b* comprises cells B1, B2, B3 and so on which are associated with operator B. Further, the PLMN 104*c* comprises cells X1, X2 X3 and so on which are associated with operator X. The PLMN 104*c* also comprises cells Y1, Y2, Y3 and so on which are associated with operator Y The first SIM 202*a* of the multi-SIM mobile device 102 is subscribed with PLMN 104*a*, the second SIM 204*a* of the multi-SIM mobile device 102 is subscribed with PLMN 104*b*. Thus PLMN 104*a* is the HPLMN of the first SIM 202*a* and the PLMN 104*b* is the HPLMN of the second SIM 204*a*. For example, SIM A (the first SIM 202*a*) is subscribed to the PLMN A (PLMN 104*a*). That is, for example, SIM B 204A (the second SIM 204*a*) is subscribed with PLMN B (PLMN 104*b*). For example, operator of PLMN X (PLMN 104*c*) can have EPLMN agreement with operator of PLMN A and PLMN B. Each of the SIM A 202A and the SIM B 204A is associated with a protocol stack A and a protocol stack B.

In the description any reference to any particular SIM in the SIM module 306 can also be considered as reference to the corresponding protocol stack. For example, SIM A 202A can be referred as Protocol Stack A and SIM B 204A can be referred as Protocol Stack B.

The multi-SIM mobile device 102 has two RF units with the first RF unit 106 associated with the first SIM 202*a* and the second RF unit 108 associated with the second SIM 204*a*. Moreover, in situations where the operators of both PLMN 104*a* and PLMN 104*b* have an Equivalent PLMN agreement with operator of PLMN 104*c*, then PLMN 104*c* serves the multi-SIM mobile device 102 as an Equivalent PLMN (EPLMN). Thus the PLMN 104*c* is the common EPLMN for both the first SIM 202*a* and the second SIM 204*a*.

The wireless network 100 includes other PLMNs in the air, not depicted in the FIG. 1 for simplicity, that do not have any EPLMN agreement with the two HPLMNs (PLMN 104*a* and PLMN 104*b*) of the multi-SIM mobile device 102. Thus, these PLMNs do not provide service to the multi-SIM-mobile device 102 except, for emergency services.

FIG. 1A depicts a scenario where the multi SIM mobile device 102 is located in a place where coverage of PLMN 104*a* is unavailable and coverage of PLMN 104*b* and PLMN 104*c* are available. Consider that the PLMN 104*a* and PLMN 104*b* are having an equivalent operator agreement with PLMN 104*c*. So, first protocol stack 202 of first RF unit and second protocol stack 204 of second RF unit 108 contains PLMN 104*c* in their EPLMN lists.

With the existing method, when the multi-SIM mobile device 102 is situated in a region where coverage of PLMN 104*a* is unavailable, the first SIM 202*a* of the multi-SIM mobile device 102 triggers a PLMN search and camps on any one of the EPLMN cell available in the EPLMN list of the first SIM 202*a*. For example, the first SIM 202*a* camps and registers on PLMN 104*c* which is an EPLMN cell for the first SIM 202*a*. Also, since the coverage of the PLMN 104*b* is available, the second SIM 204*a* is camped and registered on PLMN 104*b* which is the HPLMN cell of the second SIM 204*a*. Further, the second SIM 204*a* also finds its suitable cells such as PLMN 104*c* which are equivalent to PLMN 104*b*, but PLMN 104*c* is not the best suitable cell for second SIM 204*a*. A suitable cell is a cell on which a multi-SIM mobile device 102 may camp when it satisfies criteria which is defined in 3GPP standards.

In an example, the PLMN 104*b* belongs to operator B, PLMN 104*c* containing PLMN X and PLMN Y belongs to operator X operator Y respectively. The below table-1 shows the suitable cell and the best suitable cell of first RF unit 106 and the second RF unit 108.

TABLE 1

| Protocol Stack A Cell Status | | Protocol Stack B Cell Status | |
|---|---|---|---|
| X1 (EPLMN Cell) | Best Suitable Cell(Presently camped) | B1 (HPLMN Cell) | Best Suitable Cell(Presently camped) |
| Y1 (EPLMN Cell) | Suitable Cell | X1 (EPLMN Cell) | Suitable Cell |
| B1 (Non-EPLMN Cell) | Not a Suitable Cell | Y1 (EPLMN cell) | Suitable Cell |

From the table-1, it is observed that the PLMN cell X is common to both the RF units.

FIG. 1A also depicts a scenario where the multi-SIM mobile device 102 is located in a place where coverage of PLMN 104*a* and PLMN 104*c* are available and coverage of PLMN 104*b* is unavailable. In such a scenario, the second SIM 204*a* of the multi-SIM mobile device 102 triggers a PLMN search and camps on any one of the EPLMN cell available in the EPLMN list of the second SIM 204*a*. For example, the second SIM 204*a* camps on PLMN 104*c* which is an EPLMN cell for the second SIM 204*a* and later registers with the on PLMN 104*c*. Also, since the coverage of the PLMN 104a is available, the first SIM 202a is camped and registered on PLMN 104a which is the HPLMN cell of the first SIM 202a.

FIG. 1B depicts a scenario where a multi-SIM mobile device 102 is located in a place where coverage of PLMN 104a and coverage of PLMN 104b is available and also the coverage of PLMN 104c are available (i.e., coverage of both PLMNS are overlapping). Hence, the first SIM 202a and the second SIM 204a of the multi-SIM mobile device 102 are camped and registered on their respective HPLMN cells, i.e., the first SIM 202a is camped on PLMN 104a and the second SIM 204a are camped on PLMN 104b. In such a scenario, both the SIMs finds out the suitable cells from their respective EPLMN lists but do not camp on them as they are not the best suitable PLMN cells.

The table-2 below shows the suitable cells and the best suitable cells of first SIM 202a and the second SIM 204a.

TABLE 2

| Protocol Stack A Cell Status | | Protocol Stack B Cell Status | |
|---|---|---|---|
| A1 (HPLMN Cell) | Best Suitable Cell(Presently camped) | B1 (HPLMN Cell) | Best Suitable Cell(Presently camped) |
| B1 (Non-EPLMN Cell) | Not a Suitable Cell | A1 (Non-EPLMN cell) | Not a Suitable Cell |
| X1 (EPLMN Cell) | Suitable Cell | X1 (EPLMN Cell) | Suitable Cell |
| Y1 (EPLMN Cell) | Suitable Cell | Y1 (EPLMN cell) | Suitable Cell |

From the table-2, it is observed that the PLMN cell X1 and PLMN cell Y1 belonging to PLMN 104c are common to both the RF units.

In an embodiment, let us assume that International Mobile Subscriber Identity (IMSI) of both the SIMs is aligned in such a way that both the protocol stacks listen to the same paging group when camped on same PLMN cell. In order to receive an incoming call or short messaging service (SMS), the multi-SIM mobile device 102 should be listening to a paging channel in an idle mode. In a PLMN cell, single or multiple paging channels may be established. The decision of selecting which paging channel has to be used is decided based on the IMSI of both the SIMs.

In a typical example of the dual SIM mobile device whenever both the SIMs is camped on the UMTS, IMSIs of both the SIMs associated with the corresponding protocol stack are aligned such that the following equations become true, Let's consider SIM A and SIM B are the two SIMs of the Dual SIM Device; Paging Occasion of SIM A=Paging Occasion of SIM B Paging indicator of SIM A=Paging Indicator of SIM B, and Index of Selected SCCPCH of SIM A=Index of Selected SCCPCH of SIM B With the above assumption, the Protocol Stack A associated with SIM A can also receive paging for the Protocol Stack B associated with SIM B and vice versa.

Hence, when both the protocol stacks camp on one common suitable PLMN cell, then both the RF units receives same set of broadcast information and paging information. The information received from both the RF units is a duplication of one to other in complete idle mode when both the RF units listen to same PLMN cell. Since, the information received from both RF units is duplications of one to the other, one of the RF units is switched off which saves the battery power of the multi-SIM mobile device 102.

The below table-3, represents the combinations where both the protocol stacks have a chance of camping on to the same PLMN cell and also the behavior of dual SIM mobile device under this condition in the existing art.

TABLE 3

| HPLMN Coverage | | | | | Present Dual SIM Mobiles Behavior | | |
|---|---|---|---|---|---|---|---|
| STACK A | STACK B | EPLMN List Present? | | | Stack A camps on | Stack B camps on | No. Of |
| (PLMN A) | (PLMN B) | STACK A | STACK B | Additional Conditions | Normal Service Through | Normal Service Through | Active RFs |
| No | Yes | Yes | Yes | Both the Protocol Stacks have Common EPLMNs | Stack A's EPLMN | Stack B's HPLMN | TWO |
| Yes | No | Yes | Yes | Both the Protocol Stacks have Common EPLMNs | Stack A's HPLMN | Stack B's EPLMN | |
| Yes | Yes | No | Yes | PLMN A is present in Stack B's EPLMN list | Stack A's HPLMN | Stack B's HPLMN | |
| | | Yes | No | PLMN B is present in Stack A's EPLMN list | Stack A's HPLMN | Stack B's HPLMN | |
| | | Yes | Yes | PLMN B is present in Stack A's EPLMN list | Stack A's HPLMN | Stack B's HPLMN | |
| | | | | PLMN A is present in Stack B's EPLMN list | Stack A's HPLMN | Stack B's HPLMN | |
| | | | | Both the Protocol Stacks have Common EPLMNs | Stack A's HPLMN | Stack B's HPLMN | |

In the present dual SIM mobile behavior, when the multi-SIM mobile device 102 is located in a place where coverage of PLMN A is not available and coverage of PLMN B is available, and where both the protocol stacks have common EPLMN cells, then the first protocol stack 202 camps on the respective EPLMN cell from the respective EPLMN list through normal service and the second protocol stack 204 camps on the respective HPLMN cell i.e. PLMN B even though a common suitable EPLMN cell is present for both the protocol stacks. Hence, in this case, both the RF units of the multi-SIM mobile device 102 are active.

In a second scenario, where the multi-SIM mobile device 102 is located in a place where coverage of PLMN A is available and the coverage of PLMN B is unavailable and where both the protocol stacks have common EPLMN cells, then the first protocol stack 202 camps on the respective HPLMN cell i.e. PLMN A even though a common suitable PLMN cell is available between both the protocol stacks and the second protocol stack 204 camps on the respective EPLMN cell from the respective EPLMN list through normal service. Hence, both the RF units of the multi-SIM mobile device 102 are active. Similarly, when the multi-SIM mobile device 102 is located in a place where coverage of PLMN A and the coverage of PLMN B are available and when at least one protocol stacks have a common EPLMN cell between them, then both the protocol stacks remain camped on their respective HPLMN cells which is the best suitable cells for the PLMNs respectively even though there are common suitable EPLMN cells for at least one PLMN cells. Hence, both the RF units remain active all the time.

From the above table-3, it is observed that in any given scenario both the RF units are camped on different PLMN cells even though a common suitable PLMN cell is present between both the protocol stacks, due to which both the RF units are always active. Hence, to overcome such a situation, the proposed method forces both the protocol stacks to camp on the commonly available suitable PLMN cell (between both the protocol Stacks), such that both the RF units receives same set of broadcast and paging information (as per the assumption). Later, one of the RF units is switched off in order to avoid the duplication of messages that are received as described earlier. The method also provides a new module in order to exchange the messages between the protocol stacks (since only one protocol stack receives the broadcast and the paging information). This module is named as Stack Coordinator (SC). The detailed functionality of the module is described in the explanation given to FIG. 3.

Figure 2A:
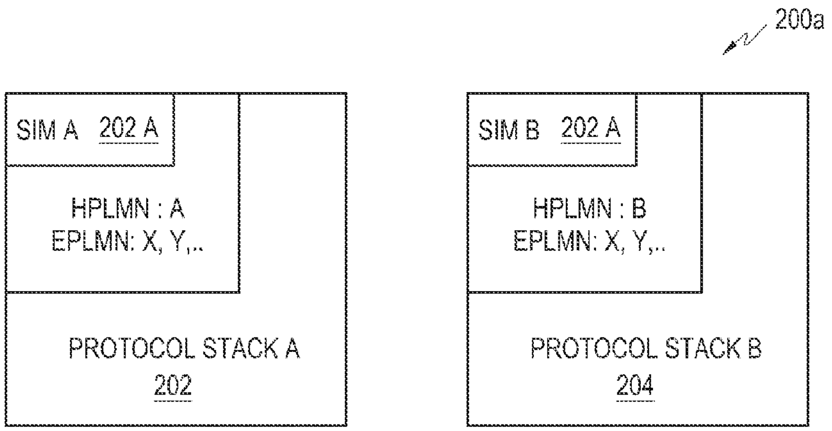
FIGS. 2A and 2B shows schematic representation of protocol stacks associated with one or more radio frequency (RF) units of the mobile device when one or more RF units are camped on one or more PLMN cells, according to embodiments as disclosed herein.
Figure 2B:
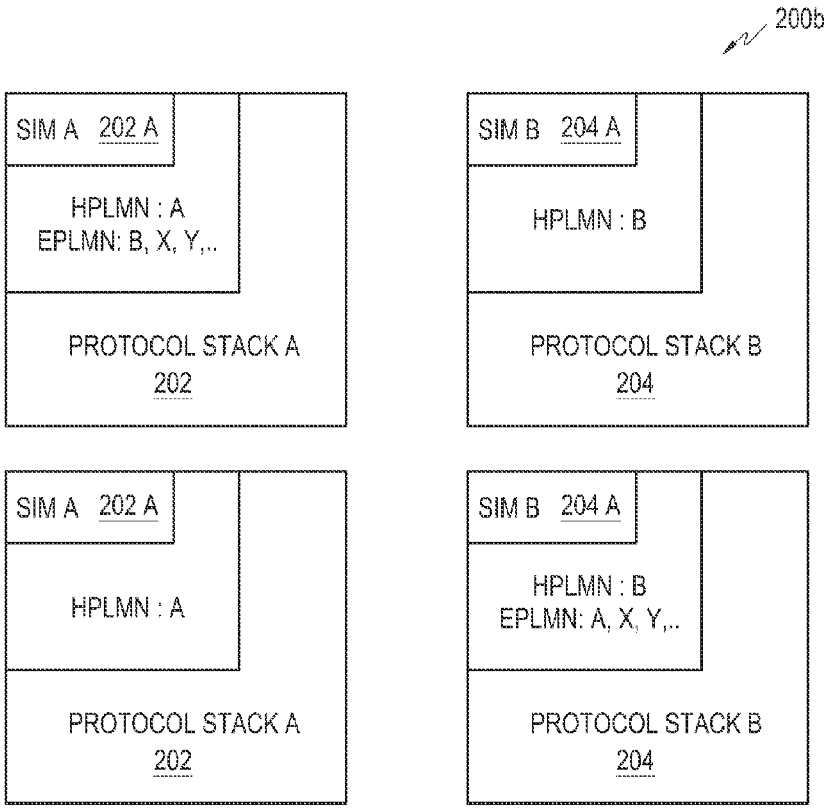

FIGS. 2A and 2B shows a schematic representation of protocol stacks associated with one or more radio frequency (RF) units of the multi-SIM mobile device 102 when the one or more RF units are camped on different PLMN cells, according to embodiments as disclosed herein. FIG. 2A depicts the status of first protocol stack 202 and second protocol stack 204 when operator of the PLMN **104*a* and operator of the PLMN 104*b* has an equivalent operator agreement with operator X of PLMN 104*c*, operator Y of PLMN 104*c* and other PLMNs. Hence, first protocol stack 202 and second protocol stack 204 contains operator X, operator Y and other PLMNs in their EPLMN lists. As per the 3GPP specification, since the best suitable cell for first protocol stack 202 and second protocol stack 204 are from the PLMN cells of their corresponding HPLMN cells, the first protocol stack 202 and the second protocol stack 204 camps on PLMN 104*a* and PLMN 104*b* respectively. From the FIG. 2A, it is observed that the PLMN cell 104*c* is common for both the SIM cards of the multi SIM mobile device 102**.

FIG. 2B depicts the status of the first protocol stack 202 and the second protocol stack 204 when operator of PLMN **104*a* has an equivalent operator agreement with operator of the PLMN 104*b*, operator of the PLMN 104*c* and other PLMNs. In such a scenario, the EPLMN list of the first SIM 202*a* contains the PLMN 104*b*, PLMN X, PLMN Y and other PLMNs. As per the 3GPP specification, since the best suitable cell for the first RF unit 106 and the second RF unit 108 are from the PLMN cells of their corresponding HPLMN cells, the first RF unit 106 and second RF unit 108 camps on the PLMN 104*a* and the PLMN 104*b* respectively. From the FIG. 2B, it is also observed that the PLMN cell 104*b* is common for both the first SIM 202*a* and the second SIM 204*a* of the multi-SIM mobile device 102. In an exemplary embodiment, operator of PLMN 104*b* can also have an equivalent operator agreement with operator of the PLMN 104*a*, operator of the PLMN 104*c* and other PLMNs. In such a scenario, the EPLMN list of the second SIM 204*a* contains PLMN 104*a*, PLMN X, PLMN Y and other PLMNs. As per the 3GPP specification, since the best suitable cell for first RF unit 106 and second RF unit 108 are from the PLMN cells of their corresponding HPLMN cells, the first RF unit 106 and the second RF unit 108 camps on PLMN 104*a* and PLMN 104*b* respectively. Hence, PLMN 104*a*** becomes the common suitable cell for both the RF units.

With the existing methods, considering the embodiments described above, the first RF unit 106 and second RF unit 108 of the multi-SIM mobile device 102 do not camp on the one or more common suitable PLMN cells available in the wireless network 100 even though the multi-SIM mobile device 102 is able to identify the one or more common suitable PLMN cells. This is because, the multi-SIM mobile device 102 is already camped on the best suitable PLMN cell and the identified one or more common suitable PLMN cells are only suitable PLMN cells and are not best suitable PLMN cells for both the RF units.

Figure 3:
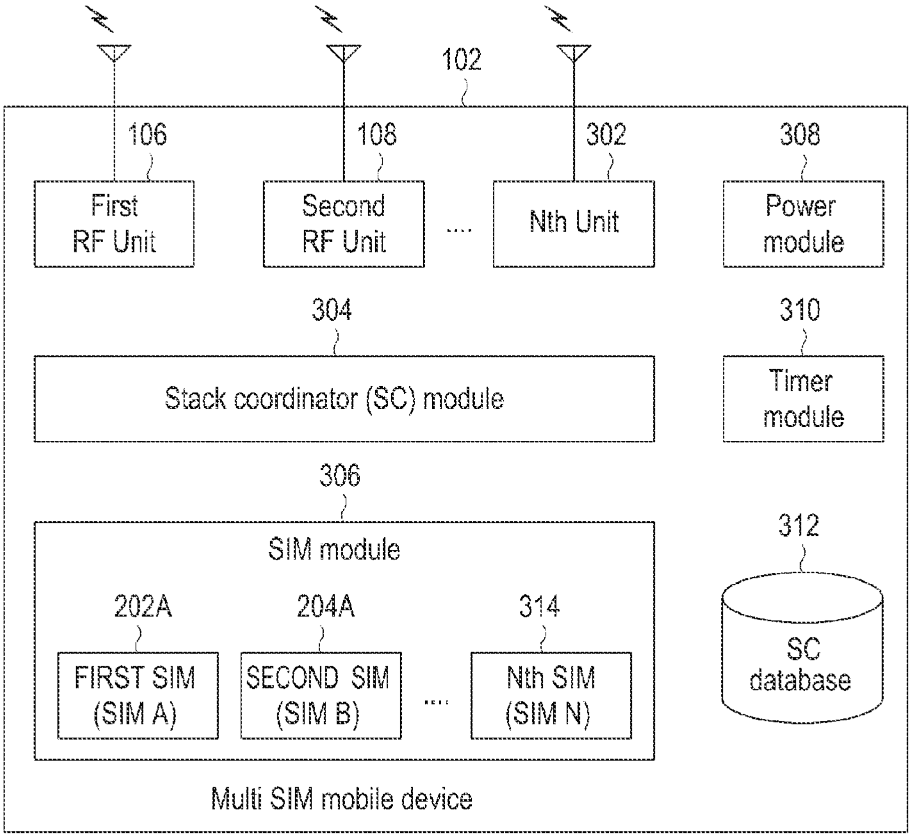
FIG. 3 is a block diagram illustrating various components of a multi SIM mobile device, according to embodiments as disclosed herein.

FIG. 3 is a block diagram illustrating various components of a multi-SIM mobile device, according to embodiments as disclosed herein. The FIG. 3 depicts the multi-SIM mobile device 102 with a SIM module 306, a SC module 304, a SC database 312, RF units including first RF unit 106, second RF unit 108 up to Nth RF unit 302 respectively, a timer module 310 and a power module 308. The SIM module 306 can include a plurality of SIMs such as the first SIM **202*a*, the second SIM 204*a* up to a Nth SIM 314, where each SIM may be subscribed to different PLMN operators in the wireless network 100**.

For example, SIM A (the first SIM **202*a*) is subscribed to the PLMN A (PLMN 104*a*). For example, SIM B 204A (the second SIM 204*a*) is subscribed with PLMN B (PLMN 104*b*). For example, operator of PLMN X (PLMN 104*c*) can have EPLMN agreement with operator of PLMN A and PLMN B. Each of the SIM A 202A and the SIM B 204**A is associated with a protocol stack A and a protocol stack B.

In the description any reference to any particular SIM in the SIM module 306 can also be considered as reference to the corresponding protocol stack. For example, SIM A 202A can be referred as Protocol Stack A and SIM B 204A can be referred as Protocol Stack B.

Each of the SIMs in the SIM module 306 communicate with the PLMNs such as PLMN **104*a*, PLMN 104*b* and PLMN 104*c* in the wireless network 100 through the first RF unit 106, the second RF unit 108 to the Nth RF unit 302 independently or by utilizing combination of RF units when the multi-SIM mobile device 102 triggers the PLMN search and further stays in idle state. The combination of RF units to be used is also based on the availability of the suitable PLMNs (HPLMNs and EPLMNs) of the SIMs during the PLMN search triggered by the SIMs. The camping information, the registration information, the current status of the RF units such as active status corresponding to an enabled RF unit, an inactive status corresponding to a disabled RF unit is maintained in the SC database 312**.

The table-4 below lists some of the example functions of the SC module 304 and the information maintained by the SC database 312 for multiple SIMs such as the first SIM **202*a*, the second SIM 204*a***:

TABLE 4

| STACK COORDINATOR | | | | | |
|---|---|---|---|---|---|
| Protocol Stack A | ⟺ | Functions: 1. Blind cell and Stored cell selection procedure Coordination 2. Random selection of a Protocol Stack for performing any action. 3. Validate a cell whether it falls under the custom defined limits 4. Common Suitable PLMN Search timer Management | Database of Both Stacks: 1. LIST A: Ranked List of Suitable cells of Stack A 2. LIST B: Ranked List of Suitable cells of Stack B 3. LIST X: Temporary list maintaining the cell information | ⟺ | Protocol Stack B |

Depending on the actions performed by both the protocol stacks, SC database 312 will be updated by the corresponding Protocol Stack. The SC database 312 is commonly accessible to both the Stacks.

The SC module 304 coordinates the actions of the first SIM 202*a* and the second SIM 204*a* during camping procedure, registration procedure, sharing of system information and paging information and handling of High Priority Public Land Mobile Network (HPPLMN) timers based on the information maintained in the SC database 312. The HPPLMN timers for the first SIM 202*a* and the second SIM 204*a* are managed by the SC module 304 using the timer module 310.

In an embodiment, when both the RF units or either one of the RF units are camped on its EPLMN, the HPPLMN search timer is not started in the corresponding RF unit to avail periodic searches for high priority PLMNs. That is, the HPPLMN search timer of each of first RF unit 106 and second RF unit 108 are hold in an inactive mode when at least one of the first RF unit 106 and the second RF unit 108 are not camped on their respective HPLMN cells (which means they are camped on VPLMN cell). This is made so that the corresponding RF unit stays in VPLMN cell itself even though the corresponding HPLMN cell is available and thus disabling the other RF unit. In an embodiment, the HPPLMN search timer is started for the RF unit which has not camped on its HPLMN, only when both the RF units gets camped onto different PLMN cells due to unavailability of common suitable PLMN cell.

The power module 308 includes the battery unit to supply power to the RF units and all other modules in the multi-SIM mobile device 102.

The description of the modules in the multi-SIM mobile device 102 limits to modules relevant to the embodiments of the invention for simplicity and ease of understanding. However, the multi-SIM mobile device 102 includes various other modules to support additional functionalities and operations of the multi-SIM mobile device 102. The names of the modules of the multi-SIM mobile device 102 are used for illustrative purposes only and should not be considered as a limitation.

Figure 4A:
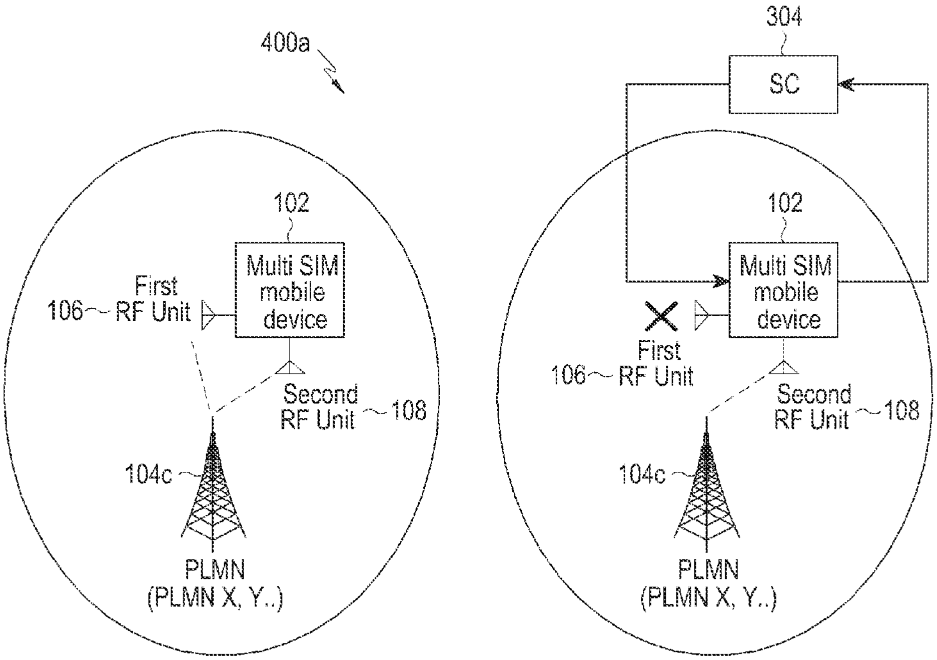
FIGS. 4A-4C illustrate behavior of the multi-SIM mobile device in the wireless communication system under various scenarios, according to embodiments as disclosed herein.
Figure 4B:
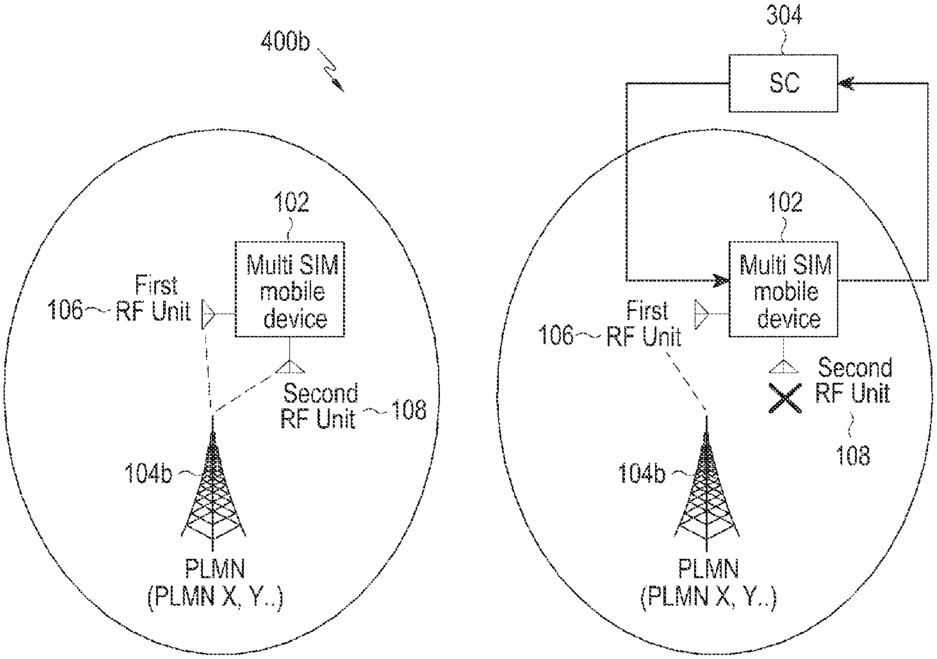
Figure 4C:
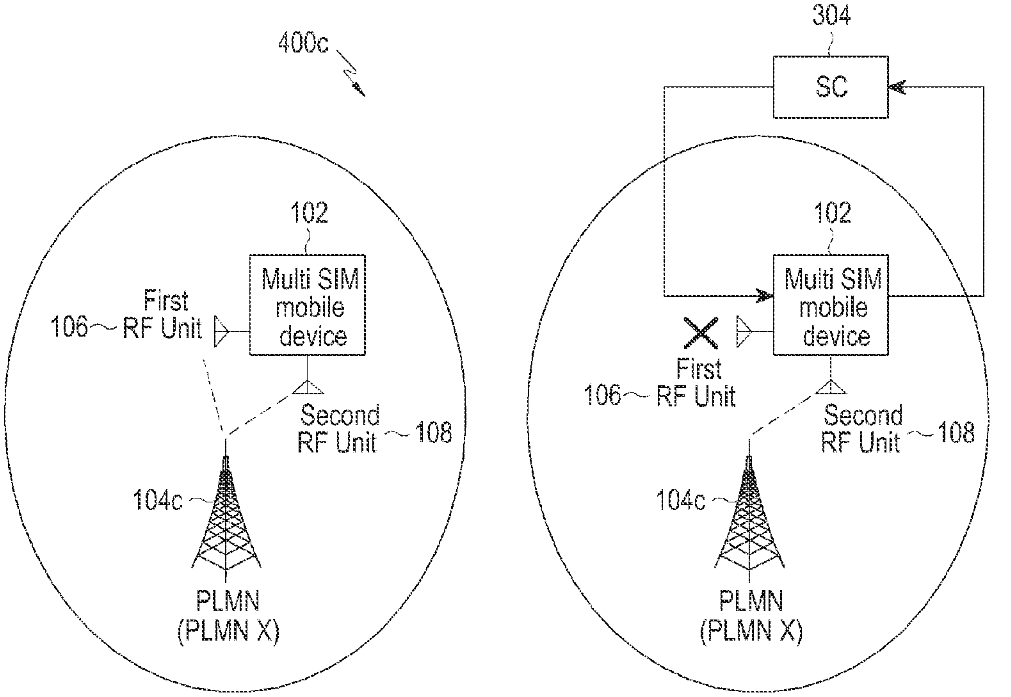

FIGS. 4A-4C illustrates behavior of the multi-SIM mobile device in the wireless communication system under various scenarios, according to embodiments as disclosed herein. FIG. 4A illustrates a scenario where first RF unit 106 is currently listening to operator X of PLMN 104*c* through normal service since PLMN 104*a* is unavailable and second RF unit 108 is currently listening to its HPLMN cell PLMN 104*b*. When the multi-SIM mobile device 102 finds that the operator X of PLMN 104*c* is a common suitable PLMN cell for both the RF units, then the multi-SIM mobile device 102 forces the second RF unit 108 to camp on the common suitable PLMN cell which is the PLMN 104*c* and then disables the first RF unit 106. Therefore, the second RF unit 108 which is forced to camp on the common suitable PLMN cell 104*c* receives the broadcast and paging information associated with the first protocol stack 202 and also the second protocol stack 204. In an embodiment, a vice versa to the above mentioned scenario is considered. In such a case, the second RF unit 108 is currently listening to operator X of PLMN 104*c* through normal service since PLMN 104*b* is unavailable and first RF unit 106 is currently listening to its HPLMN cell PLMN 104*a*. When the multi-SIM mobile device 102 finds that the operator X of PLMN 104*c* is a common suitable PLMN cell for both the RF units, the multi-SIM mobile device 102 forces the first RF unit 106 to camp on the common suitable PLMN cell which is the PLMN 104*c* and then disables the second RF unit 108. Therefore, the first RF unit 106 which is forced to camp on the common suitable PLMN cell 104*c* receives the broadcast and paging information associated with the first protocol stack 202 and also the second protocol stack 204.

FIG. 4B illustrates a scenario where the first RF unit 106 and the second RF unit 108 are currently camped on their respective HPLMN cells and when the operator of PLMN 104*a* has an equivalent operator agreement with operator PLMN 104*b*, PLMN 104*c* and other PLMNs. When the multi-SIM mobile device 102 finds that the operator B of the PLMN 104*b* is a common suitable PLMN cell for both the RF units, then the multi-SIM mobile device 102 forces the first RF unit 106 to camp on the common suitable PLMN cell which is the PLMN 104*b* and then disables the second RF unit 108. Therefore, the first RF unit 106 which is forced to camp on the common suitable PLMN cell 104*b* receives the broadcast and paging information associated with the first protocol stack 202 and also the second protocol stack 204.

FIG. 4C illustrates a scenario where the first RF unit 106 and the second RF unit 108 are currently camped on their respective HPLMN cells and when the operator of PLMN 104*a* and the operator of PLMN 104*b* have an equivalent operator agreement with operator PLMN 104*c* and other PLMNs. When the multi-SIM mobile device 102 finds that the operator X of PLMN 104*c* is a common suitable PLMN cell for both the RF units, the multi-SIM mobile device 102 forces the first RF unit 106 and the second RF unit 108 to camp on the common suitable PLMN cell which is the PLMN 104*c* and then disables either one of the RF unit, (say first RF unit 106). Therefore, the first RF unit 106 receives the broadcast and paging information associated with the first protocol stack 202 and also the second protocol stack 204.

The below table-5 represents the behavior of the multi-SIM mobile device 102 with respect to FIG. 4.

TABLE 5

| HPLMN Coverage STACK A (PLMN A) | HPLMN Coverage STACK B (PLMN B) | EPLMN List Present? STACK A | EPLMN List Present? STACK B | Additional Conditions | Dual SIM Mobiles Behavior with Proposed Solution: Stack A camps on Normal Service Through | Dual SIM Mobiles Behavior with Proposed Solution: Stack B camps on Normal Service Through | No. Of Active RFs |
|---|---|---|---|---|---|---|---|
| No | Yes | Yes | Yes | Both the Protocol Stacks have Common EPLMNs | Stack A's EPLMN | Forced to camp on Same EPLMN on which Stack A has camped. | ONE |
| Yes | No | Yes | Yes | Both the Protocol Stacks have Common EPLMNs | Forced to camp on Same EPLMN on which Stack B has camped. | Stack B's EPLMN | |
| Yes | Yes | No | Yes | PLMN A is present in Stack B's EPLMN list | Stack A's HPLMN | Forced to camp on Stack A's HPLMN | |
| | | Yes | No | PLMN B is present in Stack A's EPLMN list | Forced to camp on Stack B's HPLMN | Stack B's HPLMN | |
| | | Yes | Yes | PLMN B is present in Stack A's EPLMN list | Forced to camp on Stack B's HPLMN | Stack B's HPLMN | |
| | | | | PLMN A is present in Stack B's EPLMN list | Stack A's HPLMN | Forced to camp on Stack A's HPLMN | |
| | | | | Both the Protocol Stacks have Common EPLMNs | Forced to camp on Common EPLMN | Forced to camp on Common EPLMN | |

From the above table, we observe that, in any given scenario only one RF unit is active during the complete idle mode of operation.

Figure 5:
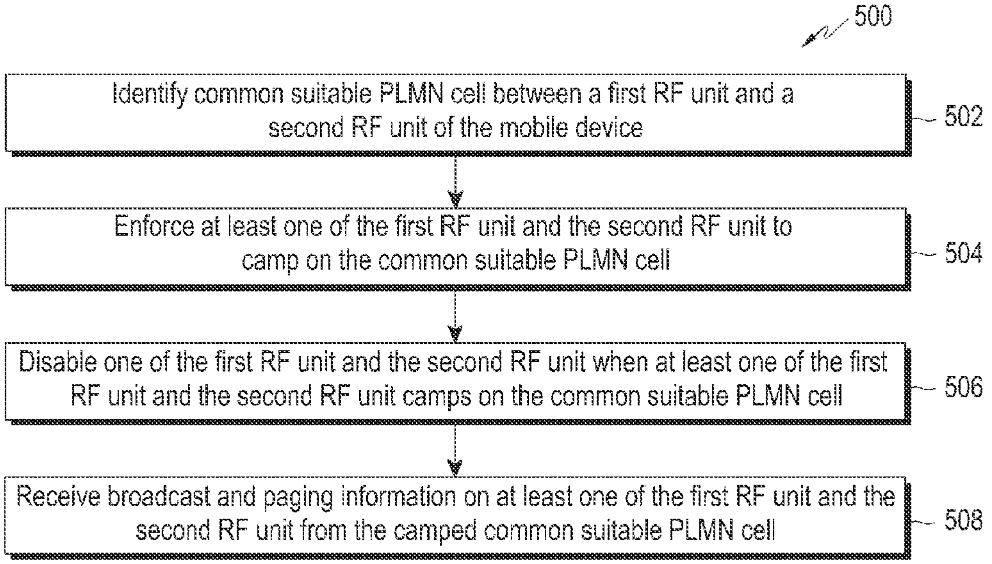
FIG. 5 is a flowchart illustrating a method of operating the multi-SIM mobile device, according to embodiments as disclosed herein.

FIG. 5 is a flowchart illustrating a method 500 of operating a multi-SIM mobile device 102, according to embodiments as disclosed herein. At step 502, common suitable PLMN cell is identified between a first RF unit 106 and a second RF unit 108 of multi-SIM mobile device 102. At step 504, at least one of first RF unit 106 and second RF unit 108 are forced to camp on the identified common suitable PLMN cell. At step 506, one of first RF unit 106 and second RF unit 108 is disabled when at least one of first RF unit 106 and second RF unit 108 camps on the common suitable PLMN cell. At step 508, broadcast and paging information is received on at least one of first RF unit 106 and the second RF unit 108 from the camped common suitable PLMN cell and shares the same with the other SIM.

In an embodiment, the multi-SIM mobile device 102 performs the above steps considering the following assumptions:

HPLMNs of both the stacks are not same.

EHPLMN List is empty

Operator Preferred PLMN list and User preferred PLMN list are empty.

The PLMNs which are present in air (other than a registered PLMN (RPLMN) and PLMNs present in EPLMN list), does not have any Equivalent operator agreement with the HPLMN.

When either one of the protocol stacks or both the protocol stacks attempt to register on to its Equivalent PLMN, then in the registration accept message from the EPLMN Operator, the multi-SIM mobile device 102 receives the Equivalent PLMNs of the multi-SIM mobile device's 102 HPLMN (other than the currently camped PLMN).

Figure 6A:
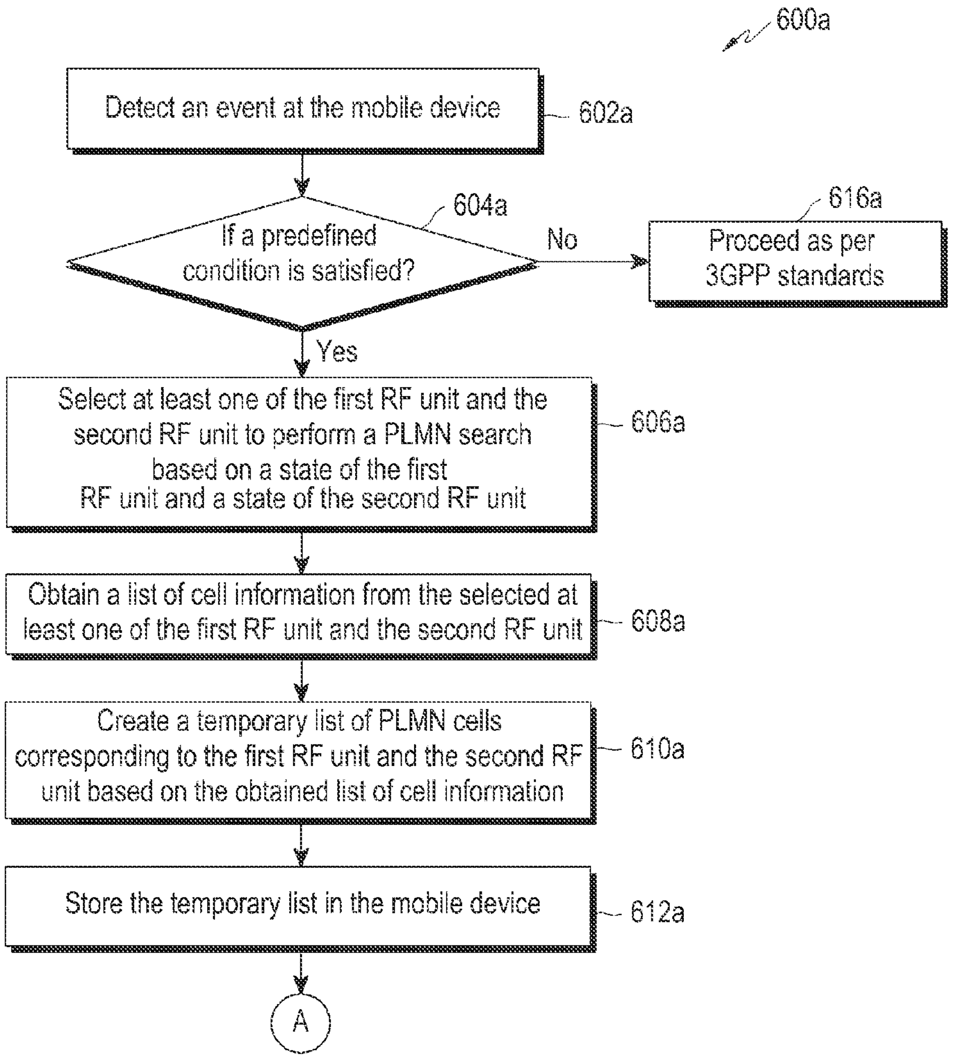
FIG. 6A-6E are flowcharts illustrating a method of creating a temporary list of PLMN cells corresponding to the first RF unit and the second RF unit and storing the temporary list of PLMN cells in the multi-SIM mobile device, according to embodiments as disclosed herein.

FIG. 6A is a flowchart illustrating a method 600*a* of creating a temporary list of PLMN cells corresponding to the first RF unit 106 and the second RF unit 108 and storing the temporary list of PLMN cells in the multi-SIM mobile device 102, according to embodiments as disclosed herein. At step 602*a*, an event is detected at the multi-SIM mobile device 102. The event comprises of powering on the mobile device and searching for the respective HPLMN cell/Registered RPLMN cell to recover from loss of coverage by the first RF unit 106 and the second RF unit 108; triggering the PLMN search to recover from loss of coverage for the respective HPLMN cell/RPLMN cell by one of the first RF unit 106 and the second RF unit 108 when one of the first RF unit 106 and the second RF is in service; triggering a blind search by either one of the first RF unit 106 and the second RF unit 108 or both first RF unit and Second RF Unit; performing a reselection by the first RF unit 106 and the second RF unit 108, wherein the first RF unit 106 and the second RF unit 108 are camped on different PLMN cells; and performing a reselection when one of the first RF unit 106 and the second RF unit 108 is active.

At step 604*a*, it is determined whether a predefined condition is satisfied upon detecting the event at the multi-SIM mobile device 102. The predefined condition comprises of determining whether at least one common suitable PLMN cell is available between first RF unit 106 and second RF unit 108. Further, the predefined condition comprises of determining whether the respective HPLMN cell is available in an EPLMN list of one of the first RF unit 106 and the second RF unit 108. If either of these two predefined condition is unsatisfied, then the multi-SIM mobile device 102 proceeds as per 3GPP standards. On the other hand, if either of these two predefined condition is satisfied, then at step 606*a* at least one of the first RF unit 106 and the second RF unit 108 is selected by the SC module 304 to perform a PLMN search based on a state of first RF unit 106 and a state of second RF unit 108 such that the other RF unit is kept switched off. The state of the RF units corresponds to either in service or in loss of coverage.

At step 608*a*, a list of cell information is obtained from the selected at least one of the first RF unit 106 and the second RF unit 108. The cell information comprises of available PLMN cells, available PLMN cells in stored cell selection information corresponding to at least one of first RF unit 106 and second RF unit 108, cells of corresponding PLMNs, measurement information required for ranking PLMN cells, PLMN Identifiers (IDs) of PLMN cells, neighbor cell information, and measurement information of camped PLMN cell.

At step 610*a*, a temporary list of PLMN cells corresponding to first RF unit 106 and second RF unit 108 is created based on obtained list of cell information. The temporary list is also referred as List X in the embodiments disclosed below. The temporary list comprises of cell information relating to both the protocol stacks. At step 612*a*, the temporary list is stored in memory of the multi-SIM mobile device 102. The process is then transferred to reference A.

The embodiments describe plurality of example scenarios where the multi-SIM mobile device 102 is performing the above mentioned steps.

Figure 6B:
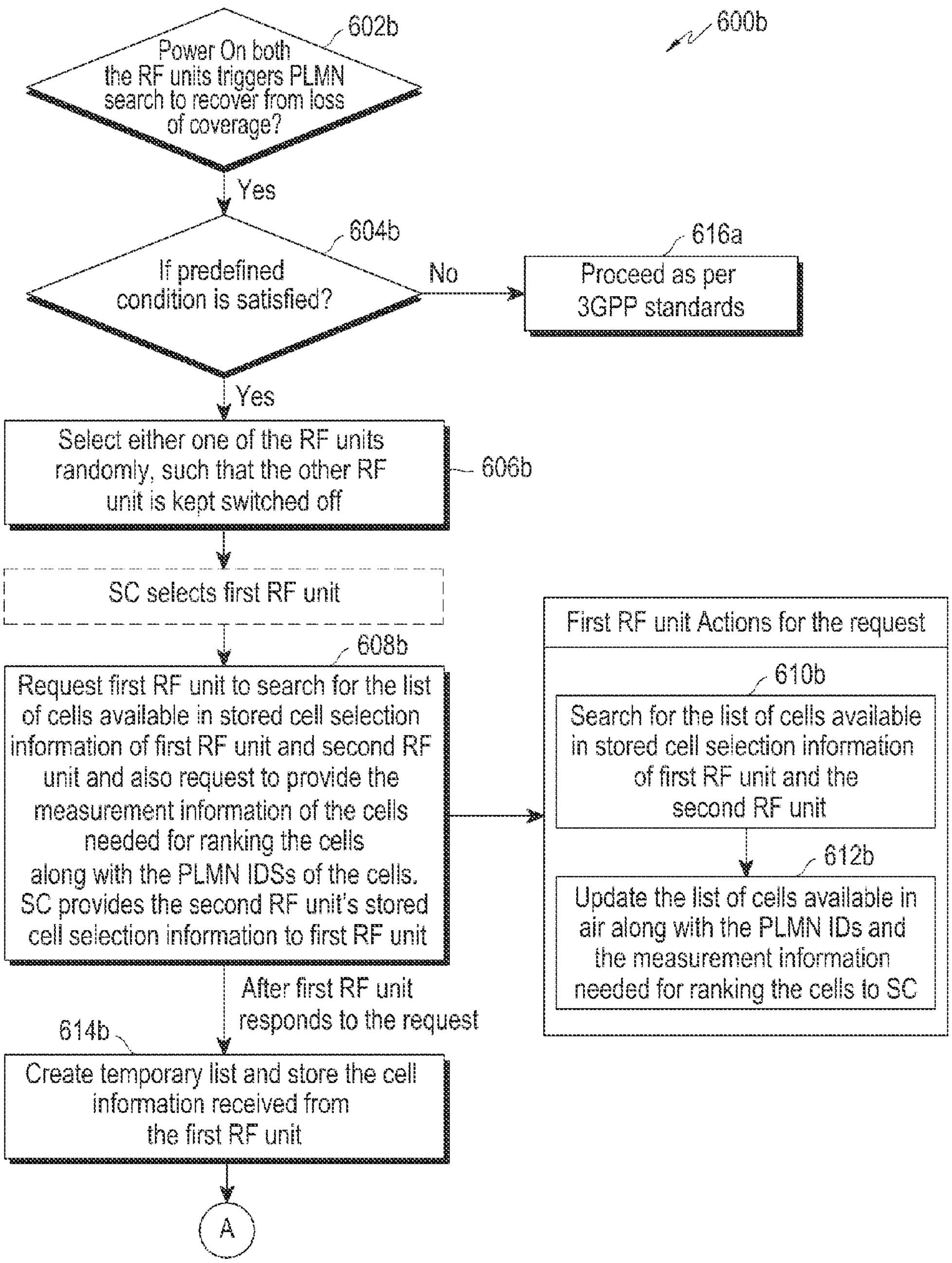

FIG. 6B depicts a first example scenario 600*b*. Consider that at step 602*b* an event of Power on the multi-SIM mobile device 102 and search for the respective HPLMN cell/RPLMN cell OR Both the RF units' triggers PLMN Search for HPLMN/RPLMN to recover from loss of coverage is detected at the multi-SIM mobile device 102. Upon detecting the event, it is determined whether a predefined condition is satisfied by the multi-SIM mobile device 102 at step 604*b*. If the predefined condition is not satisfied, then the multi-SIM mobile device 102 proceeds as per 3GPP standards. On the other hand, if the predefined condition is satisfied, then at step 606*b*, either one of the RF unit is selected randomly such that the other RF unit is kept switched off. In an example scenario, consider that the first RF unit 106 is selected by the SC module 304. At step 608*b*, the first RF unit 106 is then requested to search for the list of cells available in stored cell selection information of first RF unit 106 and the second RF unit 108. Further, the first RF unit 106 is also requested to provide measurement information of the PLMN cells required for ranking the PLMN cells along with the PLMN Identifications (IDs) of the PLMN cells. The SC module 304 provides the second RF unit 108's stored cell selection information to first RF unit 106. When this request is received by the first RF unit 106, the first RF unit 106 performs the search for the list of PLMN cells available in stored cell selection information of first RF unit 106 and second RF unit 108 at step 610*b* and updates the list of cells available in air along with the PLMN ids and the measurement information of the PLMN cells required for ranking the PLMN cells at step 612*b*. This updated cell information is then transmitted to the SC module 304 by the first RF unit 106. Once the SC module 304 receives this updated cell information, the SC module 304 creates the temporary list of PLMN cells and stored this cell information received from the first RF unit 106 at step 614*b*. The process is then transferred to reference A.

Figure 6C:
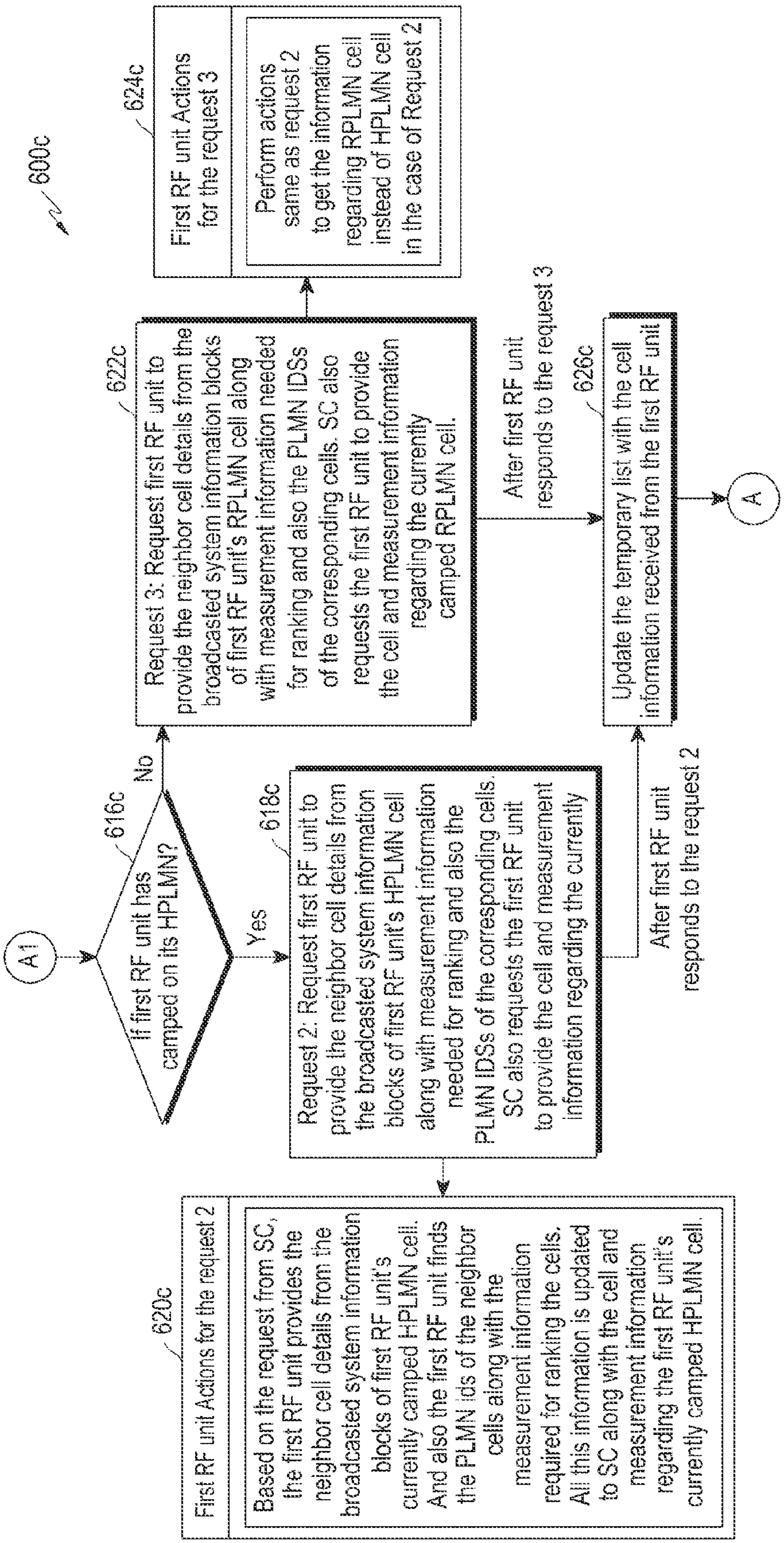

FIG. 6C depicts second example scenario 600*c*. Consider that at step 602*c*, an event of either one of the RF units triggering PLMN search for HPLMN/RPLMN to recover from loss of coverage, whereas the other RF unit is in Service is detected at the multi-SIM mobile device 102. Upon detecting the event, it is determined whether a predefined condition is satisfied by the multi-SIM mobile device 102 at step 604*c*. If the predefined condition is not satisfied, then the multi-SIM mobile device 102 proceeds as per 3GPP standards. On the other hand, if the predefined condition is satisfied, then at step 606*c*, the RF unit which is in service is selected such that the other RF unit is kept turned off Let us consider that the first RF unit 106 is in service and is selected by the SC module 304. At step 608*c*, the first RF unit 106 is then requested to search for the list of cells available in stored cell selection information of the second RF unit 108. Further, the first RF unit 106 is also requested to provide measurement information of the PLMN cells required for ranking the PLMN cells along with the PLMN Identifications (IDs) of the PLMN cells. The SC module 304 provides the second RF unit 108's stored cell selection information to first RF unit 106.

When this request is received by the first RF unit 106, the first RF unit 106 performs the search for the list of PLMN cells available in stored cell selection information of second RF unit 108 at step 610*c* and updates the list of cells available in air along with the PLMN ids and the measurement information of the PLMN cells required for ranking the PLMN cells to the SC module 304 at step 612*c*. This updated cell information is then transmitted to the SC module 304 by the first RF unit 106. Once the SC module 304 receives this updated cell information, the SC module 304 creates the temporary list of PLMN cells and stored this cell information received from the first RF unit 106 at step 614*c*.

In this case, at step 616*c*, it is also determined whether the first RF unit 106 has camped on its HPLMN cell. If the first RF unit 106 has camped on its HPLMN cell, then at step 618*c*, the SC module 304 requests the first RF unit 106 to provide the neighbor cell details from the broadcasted system information blocks of first RF unit 106's HPLMN cell along with the measurement information required for ranking and also PLMN IDs of the corresponding PLMN cells. The SC module 304 also requests the first RF unit 106 to provide cell and measurement information regarding currently camped HPLMN cell. When this request is received by the first RF unit 106, the first RF unit 106 at step 620*c*, provides the neighbor cell information from the broadcasted system information blocks of first RF unit 106's currently camped HPLMN cell. Also, the first RF unit 106 finds the PLMN IDs of the neighbor cells along with the measurement information required for ranking the PLMN cells. All this information is updated to the SC module 304 along with the cell and measurement information regarding the first RF unit 106's currently camped HPLMN cell. Once the SC module 304 receives this updated cell information, the SC module 304 updates the temporary list with this cell information received from first RF unit 106 at step 626*c*.

On the other hand, if it is determined that the first RF unit 106 is not camped on its HPLMN cell, then at step 622*c*, the SC module 304 requests the first RF unit 106 to provide the neighbor cell details from the broadcasted system information blocks of first RF unit 106's RPLMN cell along with the measurement information required for ranking and also PLMN IDs of the corresponding PLMN cells. The SC module 304 also requests the first RF unit 106 to provide cell and measurement information regarding currently camped RPLMN cell. When this request is received by the first RF unit 106, the first RF unit 106 performs actions same as mentioned in the above case to get the information regarding RPLMN at step 624*c*. Once the SC module 304 receives this updated cell information, the SC module 304 updates the temporary list with this cell information received from first RF unit 106 at step 626*c*. Later, the process is transferred to reference A.

Figure 6D:
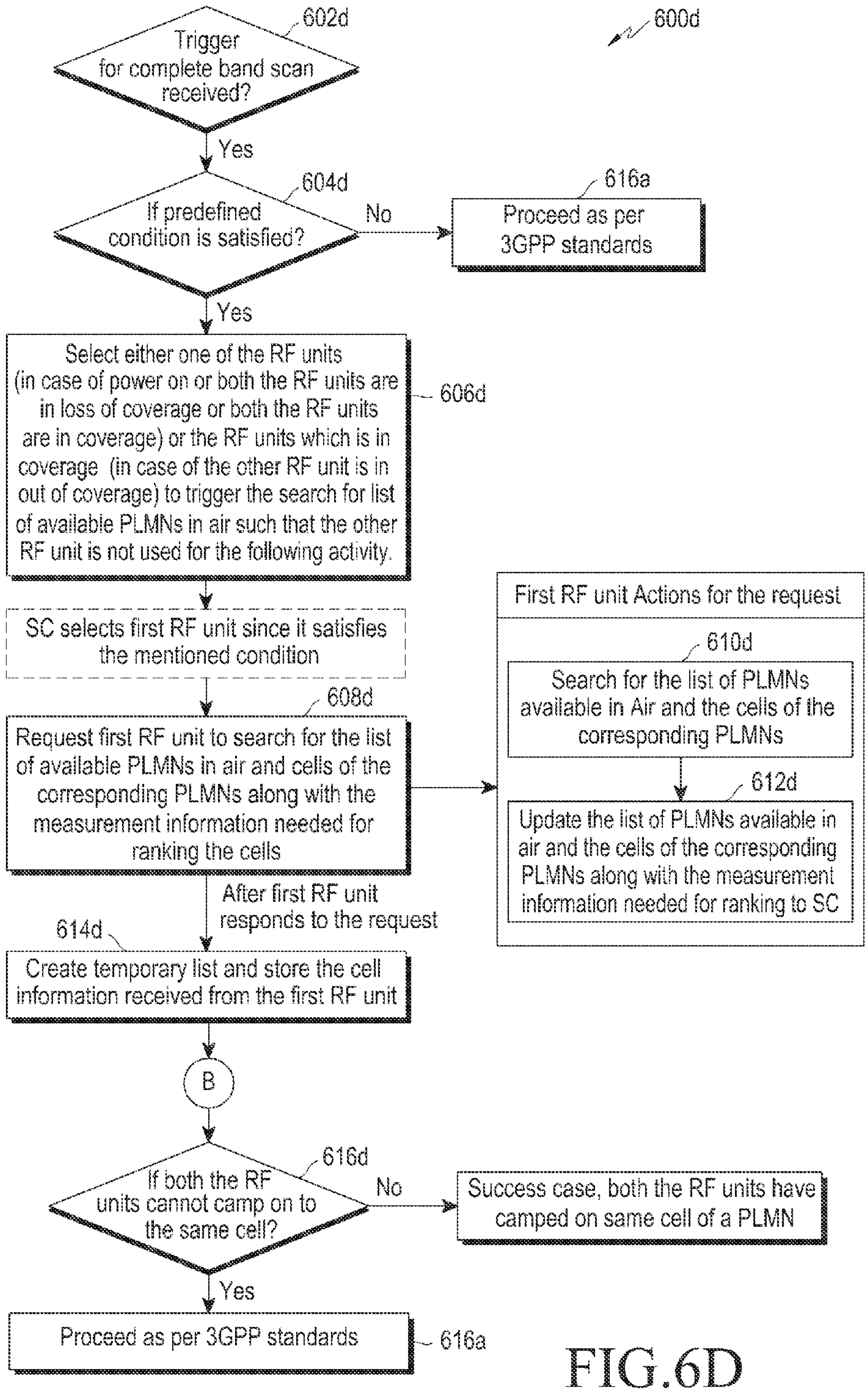

FIG. 6D depicts a third example scenario 600*d*. Consider that at step 602*d*, an event of either one of the RF unit or both the RF units ends up in triggering a Blind search (Complete band scan in search of suitable cells) is detected at the multi-SIM mobile device 102. Upon detecting the event, it is determined whether a predefined condition is satisfied by the multi-SIM mobile device 102 at step 604*d*. If the predefined condition is not satisfied, then the multi-SIM mobile device 102 proceeds as per 3GPP standards. On the other hand, if the predefined condition is satisfied, then at step 606*d*, either one of the RF unit (in case of power on or both the RF units are in loss of coverage or both the RF units are in coverage) or the RF unit which is in coverage (in case other RF unit is out of coverage) is selected to trigger the search for list of available PLMNs in air such that the other RF unit is not used during the following activity. By considering that the first RF unit 106 satisfies the previous condition, SC module 304 selects the first RF unit 106. At step 608*d*, the first RF unit 106 is then requested to search for the list of available PLMNs in air and cells of the corresponding PLMNs along with the measurement information required for ranking the PLMN cells. When the first RF unit 106 receives the request, the first RF unit 106 searches for the list of the PLMNs available in air and the cells of the corresponding PLMNs at step 610*d* and updates the list of PLMNs available in air and the cells of the corresponding PLMNs along with the measurement information for ranking to SC module 304 at step 612*d*. Once the SC module 304 receives this information from the first RF unit 106, the SC module 304 creates the temporary list of PLMN cells and stores it in the memory of the multi-SIM mobile device 102 at step 614*d*. The process is then transferred to reference B. After executing the stapes mentioned in the reference B, at step 616*d* it is determined whether both the RF units cannot camp on to the same cell. If yes, then the multi-SIM mobile device 102 proceeds as per 3GPP standards. If no, then it is declared that it is a success case where both the RF units have camped on same cell of a PLMN.

Figure 6E:
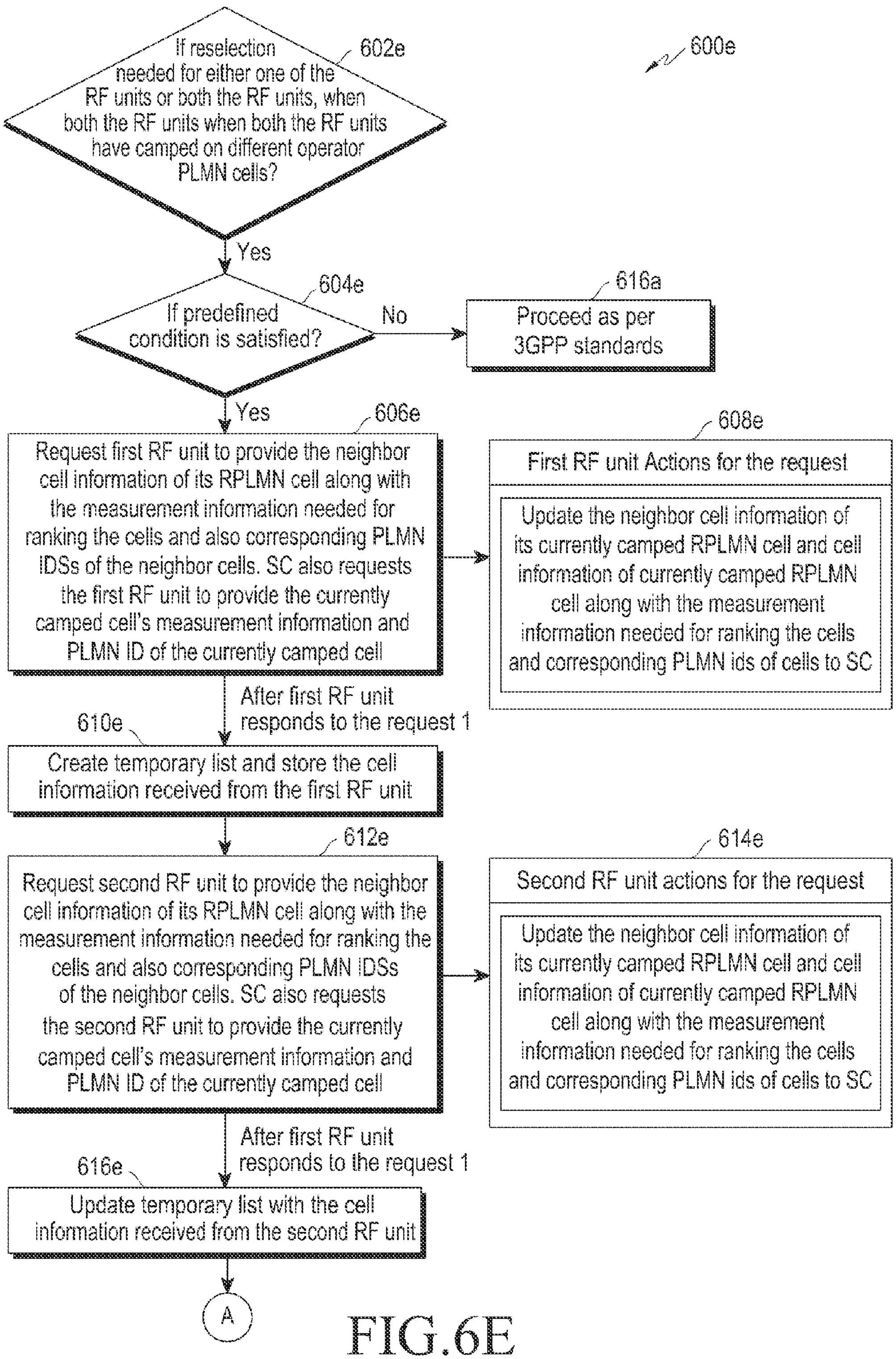

FIG. 6E depicts a fourth example scenario 600*e*. Consider that at step 602*e*, an event of both the RF units listening to different operator's cells and reselection needed is detected at the multi-SIM mobile device 102. Upon detecting the event, it is determined whether a predefined condition is satisfied by the multi-SIM mobile device 102 at step 604*e*. If the predefined condition is not satisfied, then the multi-SIM mobile device 102 proceeds as per 3GPP standards. On the other hand, if the predefined condition is satisfied, then at step 606*e*, SC module 304 requests the first RF unit 106 to provide the neighbor cell information of its RPLMN cell along with the measurement information needed for ranking the cells and also corresponding PLMN IDSs of the neighbor cells. SC module 304 also requests the first RF unit 106 to provide the currently camped cell's measurement information and PLMN ID of the currently camped cell. When this request is received by the first RF unit 106, the first RF unit 106 at step 608*e*, updates the neighbor cell information of its currently camped RPLMN cell and cell information of currently camped RPLMN cell along with the measurement information needed for ranking the cells and corresponding PLMN IDs of cells to SC module 304. Once this information is received from the first RF unit 106, the SC module 304 creates the temporary list with this cell information received from the first RF unit 106 at step 610*e*. Later, at step 612*e*, the SC module 304 requests the second RF unit 108 to provide the neighbor cell information of its RPLMN cell along with the measurement information needed for ranking the cells and also corresponding PLMN IDSs of the neighbor cells. SC module 304 also requests the second RF unit 108 to provide the currently camped cell's measurement information and PLMN ID of the currently camped cell. When this request is received by the second RF unit 108, the second RF unit 108 at step 614*e*, updates the neighbor cell information of its currently camped RPLMN cell and cell information of currently camped RPLMN cell along with the measurement information needed for ranking the cells and corresponding PLMN ids of cells to SC module 304. Once this information is received from the second RF unit 108, the SC module 304 updates the temporary list with this cell information received from the second RF unit at step 616*e*. The process is then transferred to reference A.

Figure 7:
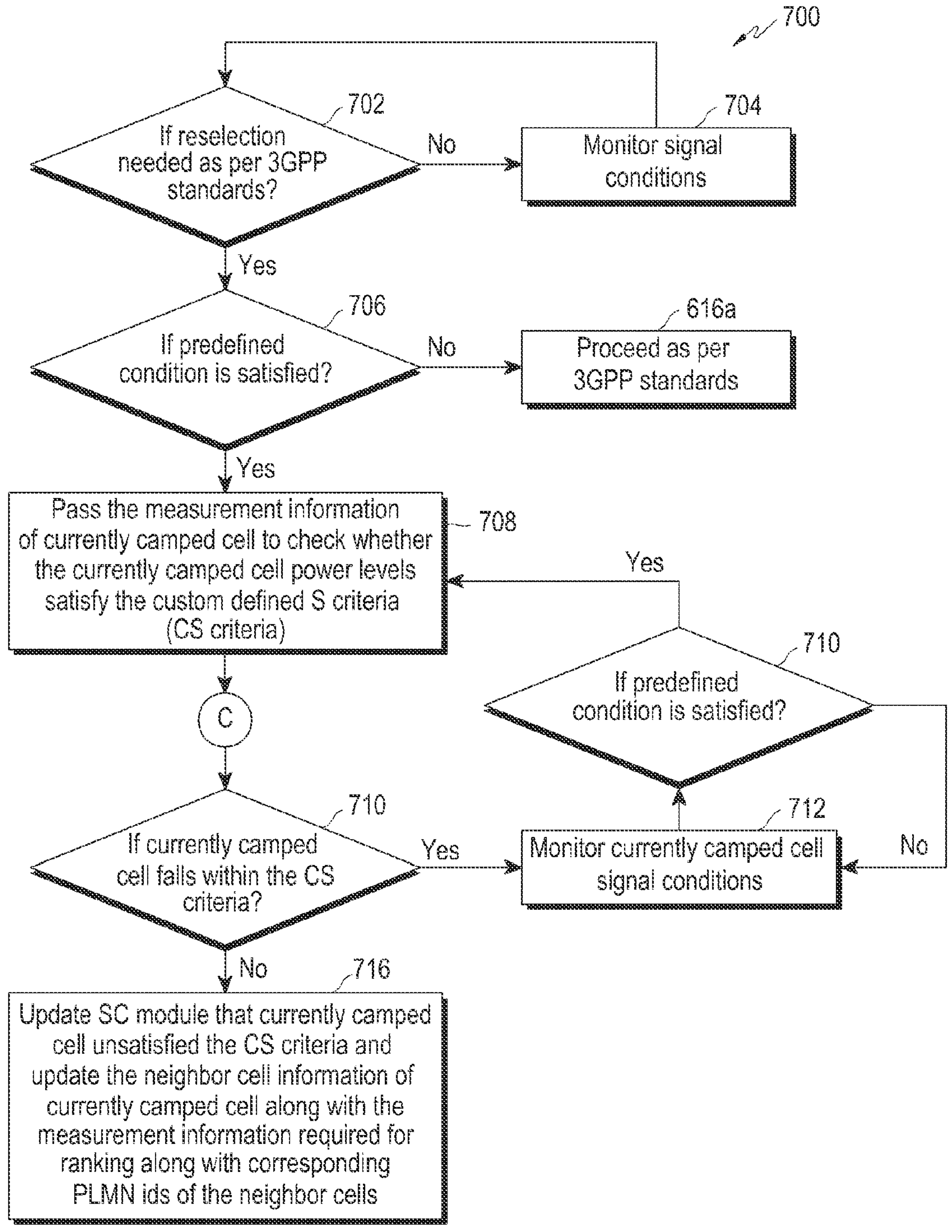
FIG. 7 is a flowchart illustrating a method of determining whether reselection is needed when only one RF unit is active (the other RF Unit is switched off since both the protocol stacks have camped on same cell of an operator), according to embodiments as disclosed herein.

FIG. 7 is a flowchart illustrating a method 700 of determining whether reselection is needed when only one RF unit is active (the other RF Unit is switched off since both the protocol stacks have camped on same cell of an operator), according to embodiments as disclosed herein. At step 702, it is periodically determined by the first RF unit 106 whether reselection is needed as per 3GPP standards. If the reselection is not needed as per 3GPP standards, then at step 704, signal conditions are monitored and the process gain jumps to step 702. If the reselection is needed as per 3GPP specification, then at step 706, it is determined whether the predefined condition is satisfied. If the predefined condition is not satisfied then the multi-SIM mobile device 102 proceeds as per 3GPP specification. On the other hand, if the predefined condition is satisfied, then at step 708 the measurement information of currently camped cell is passed to check whether the currently camped PLMN cell power levels satisfy custom defined S criteria (CS criteria). The process of checking whether the currently camped PLMN cell power levels satisfy custom defined S criteria is described with FIG. 13 in detail. At step 710, it is determined whether the currently camped PLMN cell satisfies the CS criteria. If the currently camped PLMN cell satisfies the CS criteria, then at step 712, signal conditions of currently camped PLMN cell are monitored. At step 714, it is determined whether the currently camped PLMN cell's signal conditions are going down. If the currently camped PLMN cell's signal conditions are going down, then the process is transferred to step 708. If the currently camped PLMN cell's signal conditions are not going down, then the process is transferred to step 712. On the other hand, if the currently camped PLMN cell does not satisfy the CS criteria, then at step 716, the first RF unit 106 updates the SC module 304 that the currently camped PLMN cell does not satisfy the CS criteria and updates the neighbor cell information of currently camped PLMN cell along with the measurement information needed for ranking along with the corresponding PLMN IDs of the neighbor cells to the SC module 304.

Figure 8:
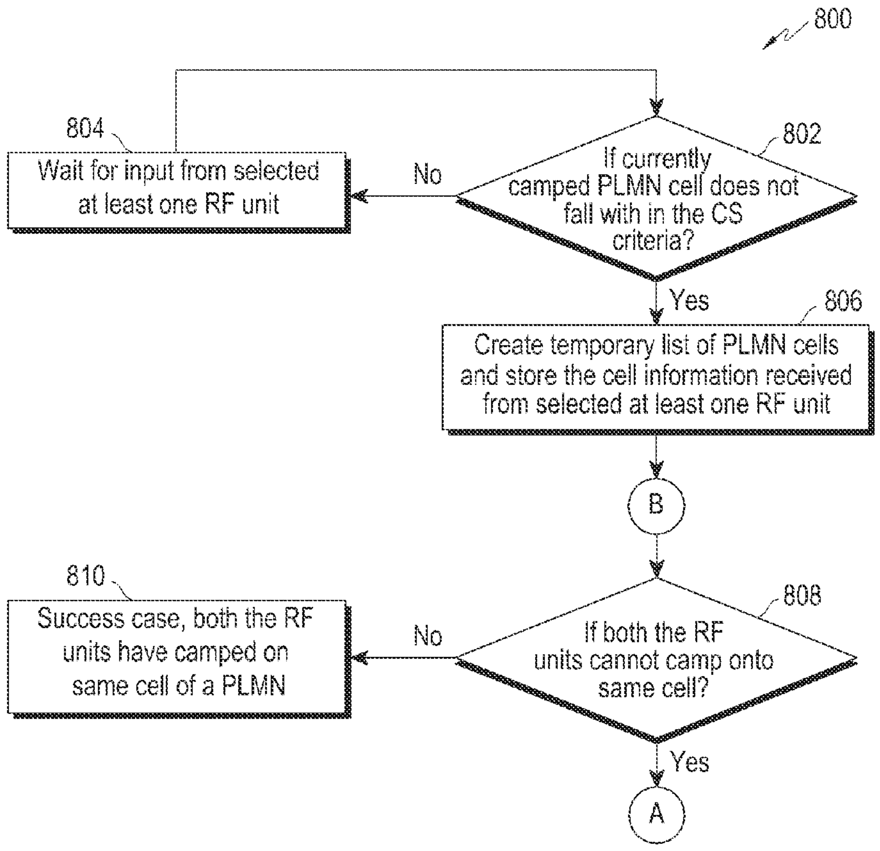
FIG. 8 is a flowchart illustrating a method of performing reselection when only one RF unit is active and the other RF unit is switched off since both the RF units are camped on same PLMN's cell by a stack coordinator module of the multi SIM mobile device, according to embodiments as disclosed herein.

FIG. 8 is a flowchart illustrating method 800 of performing reselection when only one RF unit is active and the other RF unit is switched off since both the RF units are camped on same PLMN cell by a stack coordinator module of the multi-SIM mobile device 102, according to embodiments as disclosed herein. In such a scenario, the SC module 304 performs the following steps based on the input received from first RF unit 106 (where the first RF unit 106 performs the steps mentioned in FIG. 7). At step 802, the SC module 304 determines whether the currently camped PLMN cell satisfies the CS criteria. If it is determined that the currently camped PLMN cell satisfies the CS criteria then at step 804, the SC module 304 waits for input from the first RF unit 106. Alternatively, if the SC module 304 determines that the currently camped PLMN cell does not satisfy the CS criteria, then at step 806, SC module 304 creates the temporary list of cell information and stores the cell information received from first RF unit 106. The process is then transferred to Reference B. After performing the steps mentioned in reference B, at step 808, it is determined whether both the RF units cannot camp onto same PLMN cell. If it is determined that both the RF units cannot camp onto same PLMN cell, then the process is transferred to reference A. If it is determined that both the RF units can camp onto same PLMN cell, then it is declared as success case where both the RF units camps on the same PLMN cell at step 810.

Figure 9A:
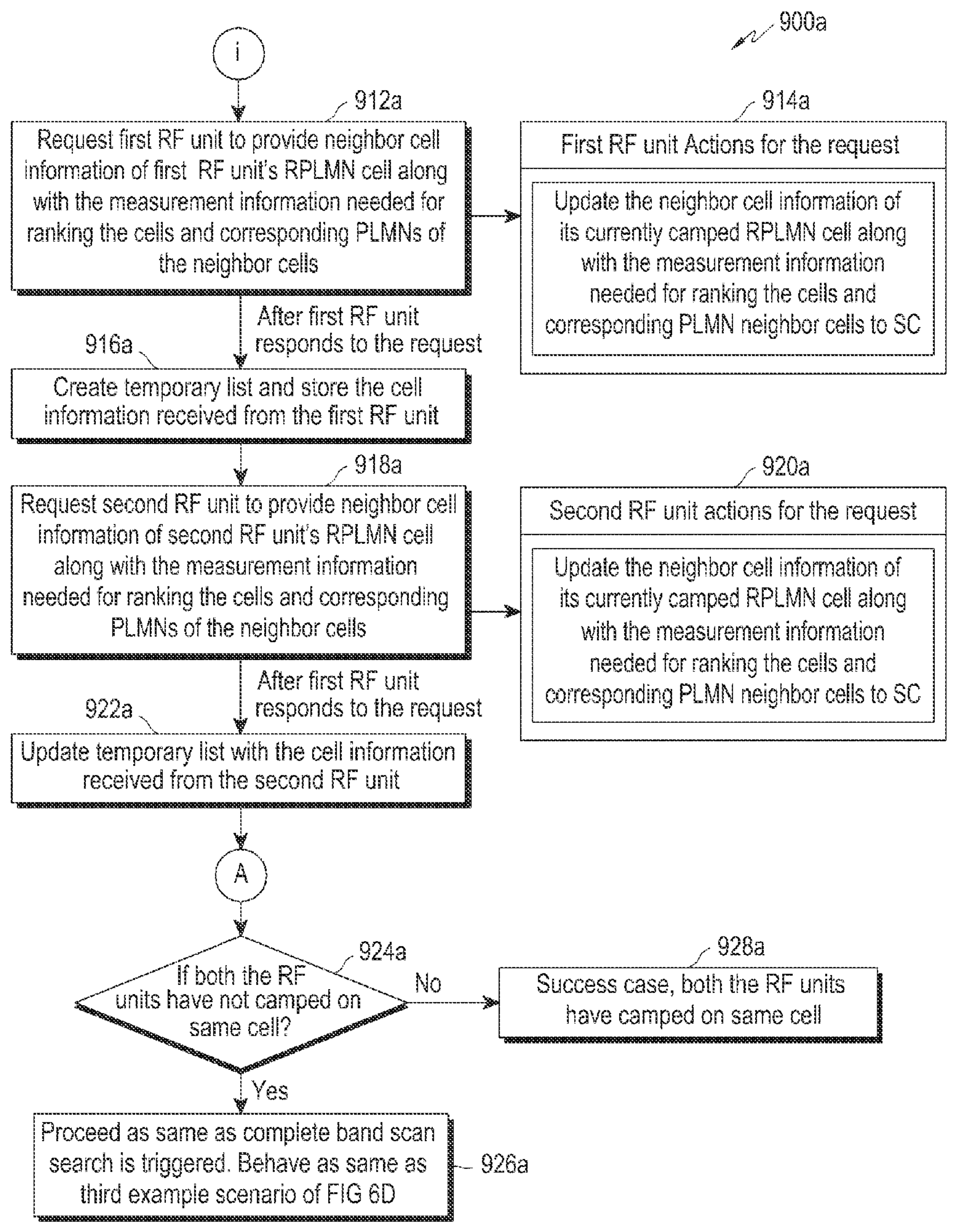
FIG. 9A is a flowchart illustrating a method of managing the common suitable PLMN search timer, according to embodiments as disclosed herein.
Figure 9B:
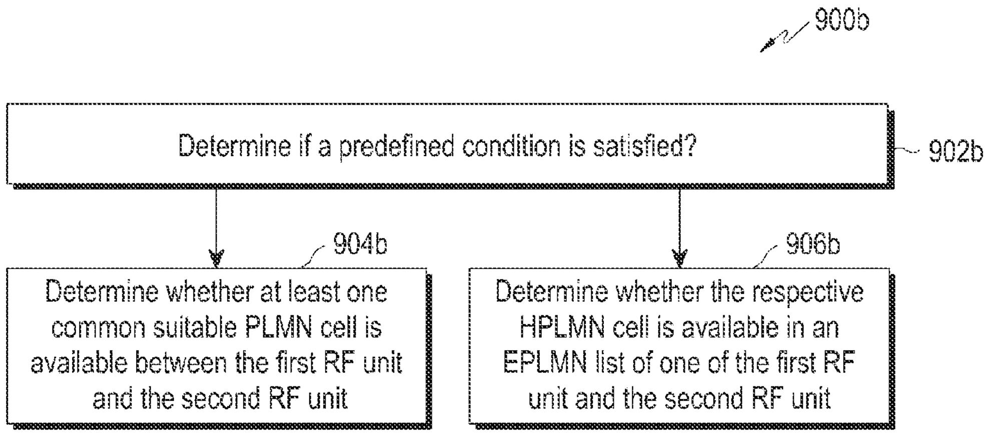
FIG. 9B is a flowchart illustrating multiple predefined conditions that are to be met by the multi-SIM mobile device, according to embodiments as disclosed herein.

FIG. 9A is a flowchart illustrating method 900*a* of managing the common suitable PLMN search timer, according to embodiments as disclosed herein. At step 902*a*, it is determined whether both the RF units are camped on different PLMN cells. If it is determined that both the RF units are camped on different PLMN cells, then at step 906*a*, a common suitable PLMN search timer is initiated with a predefined value. On the other hand, if it is determined that both the RF units are not camped on different PLMN cells, then at step 904*a*, the common suitable PLMN search timer is terminated. At step 908*a*, it is determined whether the common suitable PLMN search timer is expired. If the common suitable PLMN search timer is expired then at step 910*a*, it is determined whether the predefined condition is satisfied. The predefined condition (902*b*) comprises of determining whether at least one common suitable PLMN cell is available between first RF unit 106 and second RF unit 108 904*b* or determining whether respective HPLMN cell is available in an EPLMN list of one of first RF unit 106 and second RF unit 108 906*b* as shown in FIG. 9B. If the predefined condition is not satisfied, then the multi-SIM mobile device 102 proceeds as per 3 GPP standards. On the other hand, if it is determined that the predefined condition is satisfied, then at step 912*a*, first RF unit 106 is requested to provide neighbor cell information of first RF unit's 106 RPLMN cell along with the measurement information needed for ranking the cells and corresponding PLMNs of the neighbor cells. When the first RF unit 106 receives this request, the first RF unit 106 updates the neighbor cell information of its currently camped RPLMN cell along with the measurement information needed for ranking the cells and corresponding PLMN of neighbor cells to SC module 304 at step 914*a*. Upon receiving this cell information from the first RF unit 106, at step 916*a*, the SC module 304 creates temporary list and stores the cell information received from the first RF unit 106. At step 918*a*, second RF unit 108 is requested to provide neighbor cell information of second RF unit's 108 RPLMN cell along with the measurement information needed for ranking the cells and corresponding PLMNs of the neighbor cells. When the second RF unit 108 receives this request, then at step 920*a*, the second RF unit 108 updates the neighbor cell information of its currently camped RPLMN cell along with the measurement information needed for ranking the cells and corresponding PLMN of neighbor cells to SC. After receiving this cell information from the second RF unit 108, the SC module 304 updates the temporary list with the cell information received from the second RF unit 108 at step 922*a*. The process is then transferred to reference A. After performing the steps mentioned in reference A, at step 924*a*, it is determined whether both the RF units have not camped on same cell. If yes, then at step 926*a*, the multi-SIM mobile device 102 proceeds to complete band scan search is triggered and behaves as same as third example scenario explained with FIG. 6D. Alternatively, if both the RF units have camped on same cell, then at step 928*a*, it is declared as success case where both the RF units have camped on same cell.

Figure 10:
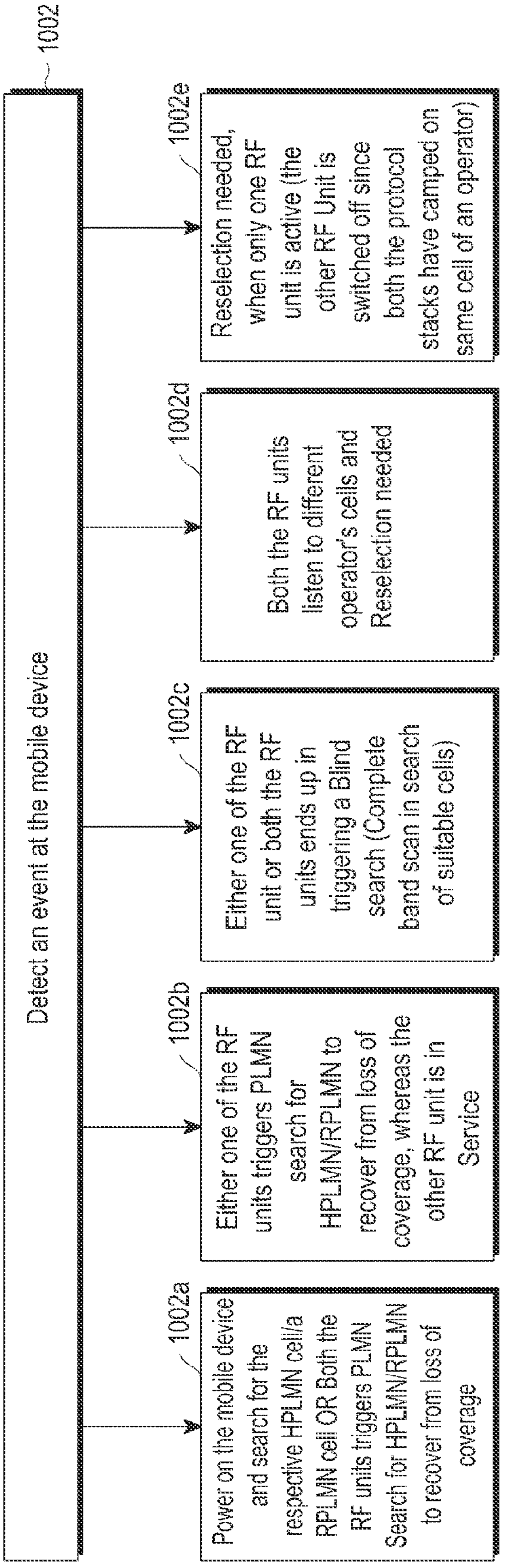
FIG. 10 is a process flowchart illustrating plurality of events detected at multi-SIM mobile device, according to embodiments as disclosed herein.

FIG. 10 is a flowchart illustrating plurality of events detected at multi-SIM mobile device 102, according to embodiments as disclosed herein. At step 1002, it is determined whether an event is detected at the multi-SIM mobile device 102. The event comprises of powering on the multi-SIM mobile device 102 and searching for the respective HPLMN cell/a RPLMN cell or both the RF units triggers PLMN search for HPLMN/RPLMN to recover from loss of coverage 1002*a*; either one of the RF units trigger PLMN search for HPLMN/RPLMN to recover from loss of coverage, whereas the other RF unit is in service 1002*b*; either one of the RF unit or both the RF units ends up in triggering a Blind search (Complete band scan in search of suitable cells) 1002*c*; both the RF units listen to different operator's cells and reselection needed 1002*d*; and reselection needed, when only one RF unit is active (the other RF Unit is switched off since both the protocol stacks have camped on same cell of an operator) 1002*e*.

Figure 11:
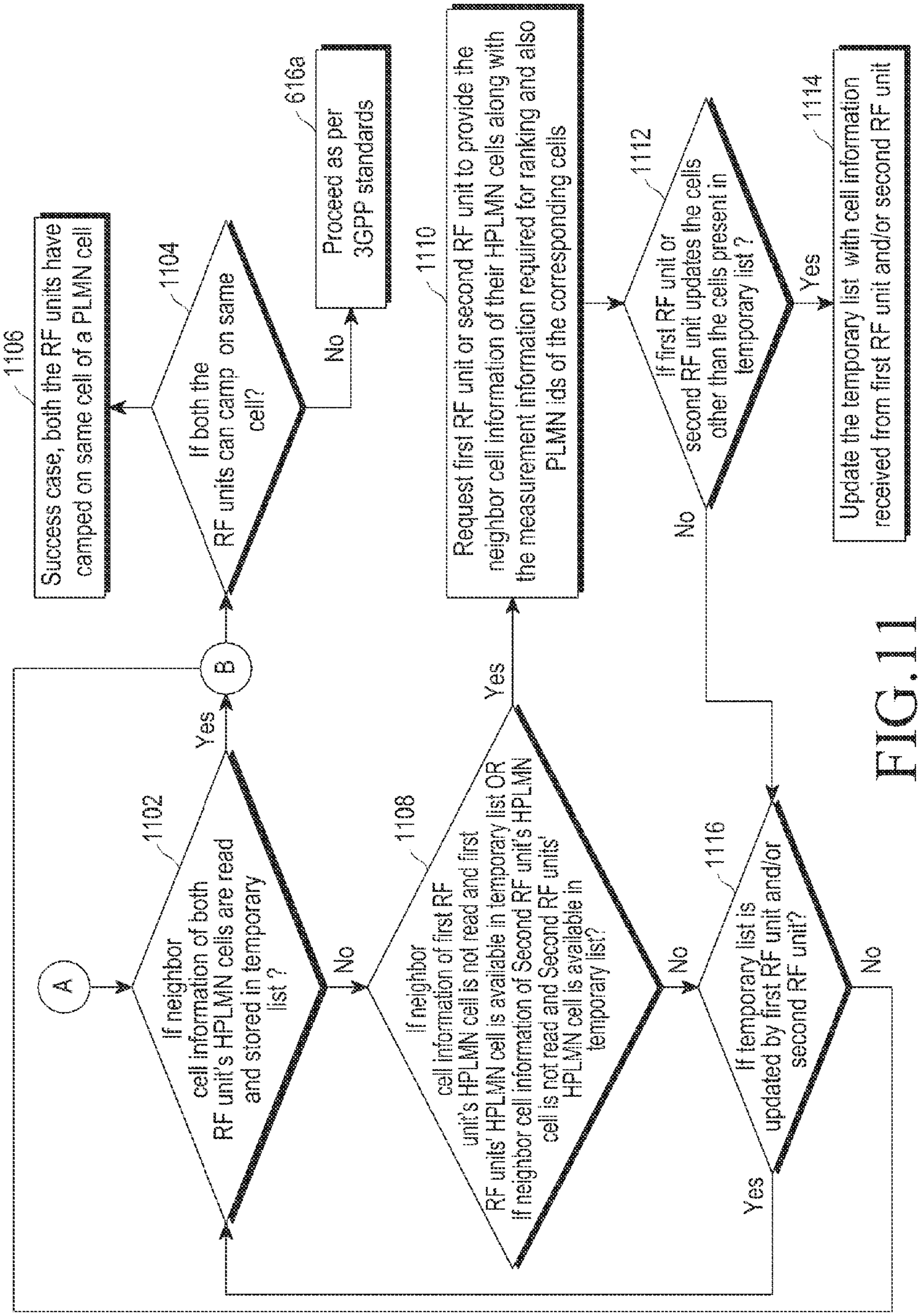
FIG. 11 is a process flowchart illustrating a method of performing a search for availability of HPLMN cells of first RF unit and second RF unit, according to embodiments as disclosed herein.

FIG. 11 is a flowchart illustrating a method 1100 of performing a search for availability of HPLMN cells of first RF unit 106 and second RF unit 108, according to embodiments as disclosed herein. FIG. 11 corresponds to reference A. At step 1102, it is determined whether neighbor cell information of both RF units' HPLMN cells are read and stored in temporary list. If it is determined that neighbor cell information of both RF unit's HPLMN cells are read and stored in temporary list, then the process is transferred to reference B. Upon completing the steps mentioned in reference B, at step 1104, it is determined whether the both the RF units can camp on the same PLMN cell. If it is determined that both the RF units can camp on the same PLMN cell, then at step 1106, both the RF units camp on the same PLMN cell. Alternatively, if both the RF units cannot camp on the same PLMN cell, then multi-SIM mobile device 102 proceeds as per 3GPP standards.

Alternatively, if it is determined that the neighbor cell information of both RF unit's HPLMN cells are not read and stored in temporary list, then at step 1108, it is determined whether neighbor cell information of first RF unit's 106 HPLMN cell is not read and first RF units' 106 HPLMN cell is available in temporary list or if neighbor cell information of second RF unit's 108 HPLMN cell is not read and second RF units' 108 HPLMN cell is available in temporary list. If yes, then at step 1110, first RF unit 106 or second RF unit 108 are requested to provide the neighbor cell information of their HPLMN cell along with the measurement information required for ranking and also PLMN ids of the corresponding PLMN cells. At step 1112, it is determined whether the first RF unit 106 or the second RF unit 108 updates the PLMN cells other than the PLMN cells present in temporary list. If the first RF unit 106 or the second RF unit 108 updates the temporary list, then at step 1114, the temporary list is updated with the cell information received from the first RF unit 106 and/or the second RF unit 108. Alternatively, if the first RF unit 106 or the second RF unit 108 does not update the temporary list, then at step 1116, it is determined whether temporary list is updated by both the first RF unit 106 and/or second RF unit 108. If it is determined that the temporary list is updated by both the first RF unit 106 and/or second RF unit 108, then the process goes to step 1102 else the process goes to reference B.

On the other hand, if it is determined that the neighbor cell information of first RF unit's 106 HPLMN cell is not read and first RF units' 106 HPLMN cell is available in temporary list or if neighbor cell information of second RF unit's 108 HPLMN cell is not read and second RF units' 108 HPLMN cell is available in temporary list, then the process directly goes to step 1116.

Figure 12A:
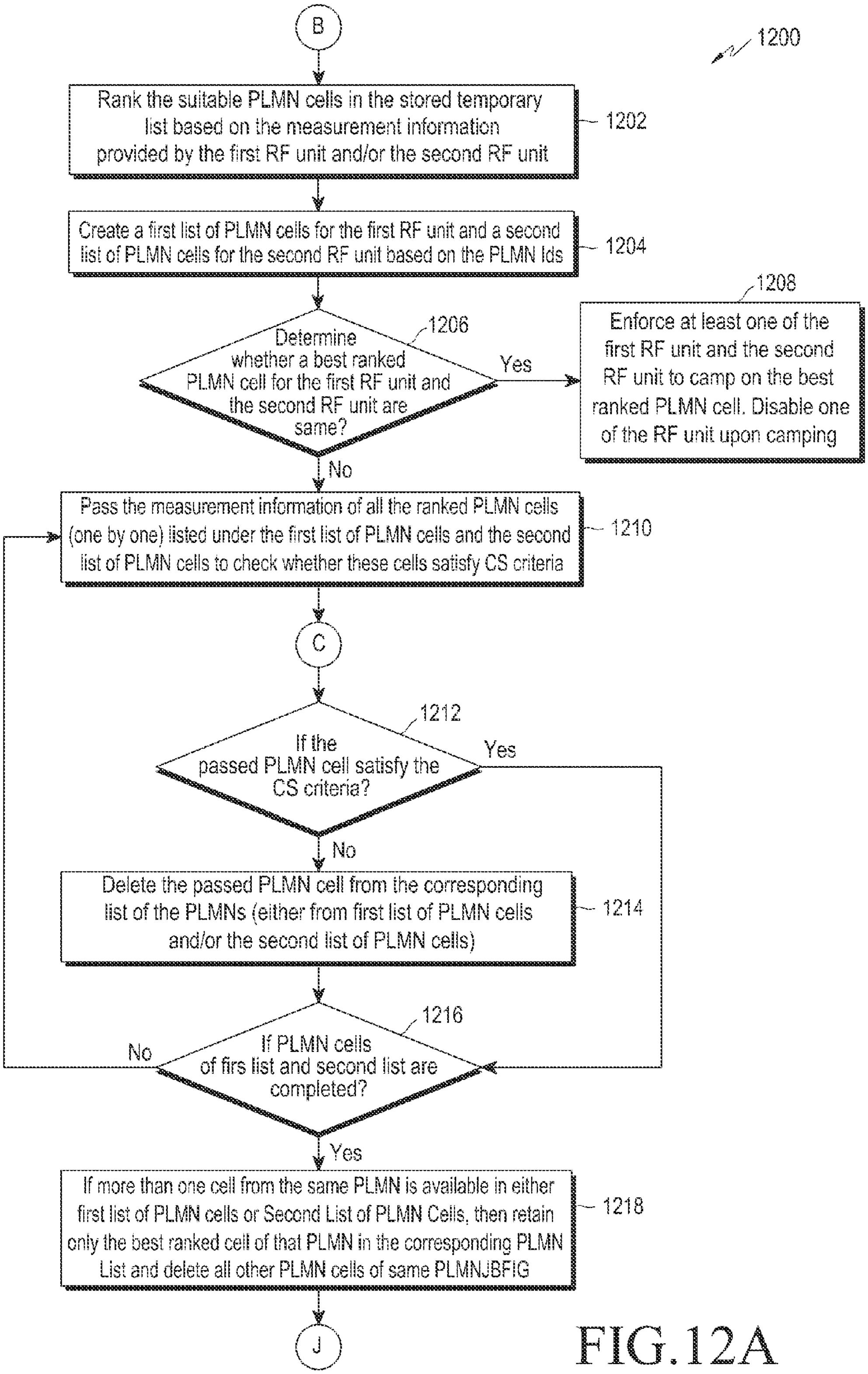
FIGS. 12A and 12B is a process flowchart illustrating a method of identifying the common suitable PLMN cell between the first RF unit and the second RF unit of the mobile device based on ranking information and enforcing at least one of the first RF unit and the second RF unit to camp on the common suitable PLMN cell, according to embodiments as disclosed herein.
Figure 12B:
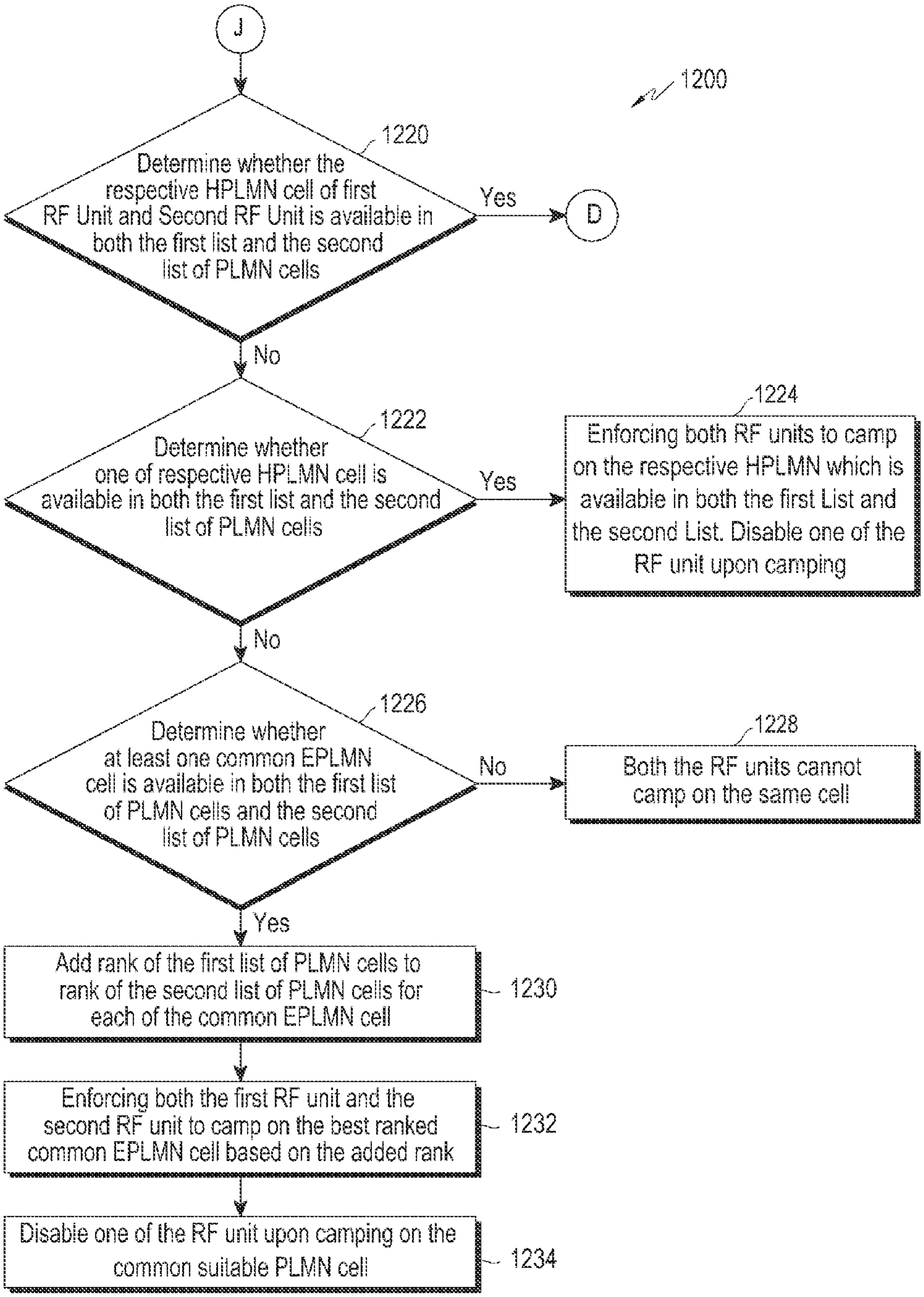

FIGS. 12A and 12B is a flowchart illustrating a method 1200 of identifying the common suitable PLMN cell between the first RF unit 106 and the second RF unit 108 of the mobile device based on ranking information and enforcing at least one of the first RF unit 106 and the second RF unit 108 to camp on the common suitable PLMN cell, according to embodiments as disclosed herein. FIGS. 12A and 12B corresponds to reference B. At step 1202, suitable PLMN cells in stored temporary list are ranked based on measurement information provided by the first RF unit 106 and/or the second RF unit 108. At step 1204, a first list of PLMN cells for first RF unit 106 and a second list of PLMN cells for second RF unit 108 are created based on the PLMN ids. The first list of PLMN cells corresponds to ranked list of suitable cells for first RF unit 106 and the second list of PLMN cells corresponds to ranked list of suitable cells for second RF unit 108. At step 1206, it is determined whether a best ranked PLMN cell for first RF unit 106 and second RF unit 108 are same. If it is determined that the best ranked PLMN cell for first RF unit 106 and second RF unit 108 are same, then at step 1208, at least one of first RF unit 106 and second RF unit 108 are enforced to camp on the best ranked PLMN cell and one of the RF unit is disabled upon camping. Alternatively, if it is determined that the best ranked PLMN cell for first RF unit 106 and second RF unit 108 are not same, then at step 1210, measurement information of all the ranked PLMN cells listed under first list of PLMN cells and second list of PLMN cells are passed one by one to check whether these cells satisfy the CS criteria. Later, the process is transferred to reference C. At step 1212, it is determined whether each of the passed PLMN cell in the first list and the second list satisfy the CS criteria. If it is determined that each PLMN cell in the first list and the second list does not satisfy the CS criteria, then at step 1214, the passed PLMN cell which does not satisfy the CS criteria are deleted from the corresponding list of the PLMNs (either from first list of PLMN cells and/or the second list of PLMN cells).

On the other hand, if it is determined that each PLMN cell in the first list and the second list satisfy the CS criteria, then at step 1216, it is further determined that all of the PLMN cells in first list and second list are completed. If it is determined that all of the PLMN cells in first list and second list are completed, then at step 1218, if more than one cell from the same PLMN is available in either first list of PLMN cells or second List of PLMN Cells, then only the best ranked cell of that PLMN are retained in the corresponding PLMN List and all other cells of same PLMN are deleted from the respective first list and second list.

If it is determined that, all of the PLMN cells in first list and second list are not completed, then the process is again transferred to step 1210. In an embodiment, the measurement information of all ranked PLMN cells listed under first list of PLMN cells are first passed one by one to check whether Custom defined S Criteria is getting satisfied or not. Later, it is determined whether all the PLMN cells under the first list of PLMN cells satisfy the CS criteria. The PLMN cells under the first list which are not satisfying the CS criteria are deleted from the first list and those which are satisfying the CS criteria are retained. If more than one PLMN cell from the same PLMN is available in the first list, then the best ranked PLMN cell of that PLMN are retained in the first list and other PLMN cells of that PLMN are removed. After each PLMN cell of the first list are completed, the process is carried on for each PLMN cell in second list.

At step 1220, it is determined whether each of the respective HPLMN cells of first RF unit 106 and second RF unit 108 is available in both the first list and the second list of PLMN cells. That is, if HPLMN cell of first protocol stack 202 is available in both the first list and the second list of PLMN cells and if HPLMN cell of second protocol stack 204 is available in both the first list and the second list of PLMN cells. If it is determined that each of the respective HPLMN cells is available in both the first list and the second list of PLMN cells, then the process is transferred to reference D. Alternatively, if it is determined that each of the respective HPLMN cells is unavailable in both the first list and the second list of PLMN cells, then at step 1222, it is further determined whether one of the respective HPLMN cells is available in both the first list and the second list of PLMN cells. If it is determined that one of the respective HPLMN cells is available in both the first list and the second list of PLMN cells, then at step 1224, both the RF units are forced to camp on the respective HPLMN cell which is determined to be present in both the first list and the second list of PLMN cells and one of the RF unit is disabled upon camping.

On the other hand, if it is determined that not even one of the respective HPLMN cells is available in both the first list and the second list of PLMN cells, then at step 1226, it is further determined whether one or more EPLMN cells is/are available in both the first list and the second list of PLMN cells. If it is determined that one or more EPLMN cells is/are unavailable in both the first list and the second list of PLMN cells, then the multi-SIM mobile device 102 decides that both the RF units cannot camp on the same cell at step 1228. Alternatively, if it is determined that one or more EPLMN cells is/are available in both the first list and the second list of PLMN cells, then at step 1230, the rank of first list and second list of PLMN cells are added for each and every commonly available EPLMN cells. For example, rank of PLMN cell 1 in first list is added to rank of PLMN cell 1 in second list and rank of PLMN cell 2 in first list is added to rank of PLMN cell 2 and so on. At step 1232, both the first RF unit 106 and the second RF unit 108 are forced to camp on the best ranked EPLMN cell which has got least addition of ranks out of the listed rank additions for the commonly available EPLMN cells. At step 1234, one of the RF unit is disabled upon camping on the common suitable PLMN cell.

Figure 13:
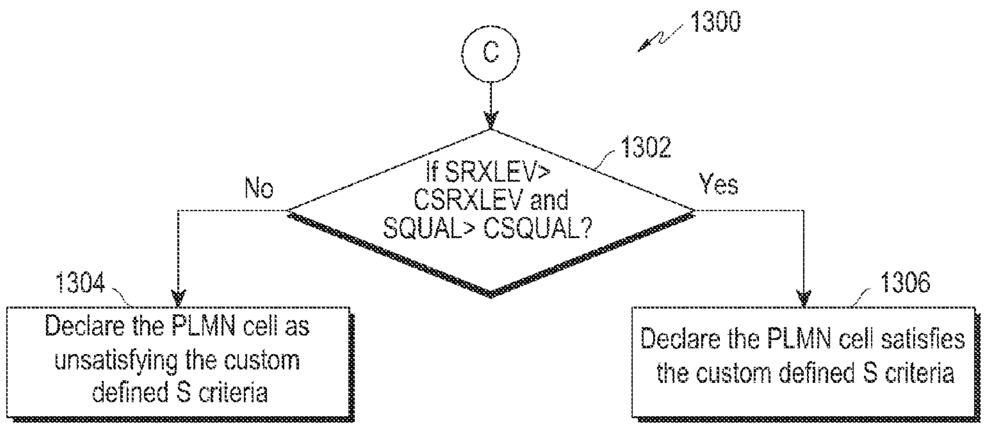
FIG. 13 is a process flowchart illustrating a method of determining whether a PLMN satisfies the CS criteria, according to embodiments as disclosed herein.

FIG. 13 is a flowchart illustrating a method 1300 of determining whether a PLMN satisfies the CS criteria, according to embodiments as disclosed herein. FIG. 13 corresponds to reference C. At step 1302, it is determined whether a cell selection RX level value in dB (Srxlev) is greater than a custom defined Srxlev value and whether a cell selection quality value in dB (Squal) is greater than a custom defined Squal. The Srxlev value and Squal value are defined in 3GPP standards. If it is determined that the Srxlev is greater than the custom defined Srxlev value and the Squal is greater than the custom defined Squal, then at step 1306, it is declared that the PLMN cell passed to check the satisfaction of CS criteria satisfies the CS criteria. On the other hand, if it is determined that the Srxlev is lesser than or equal to the custom defined Srxlev value and the Squal is lesser than or equal to the custom defined Squal, then at step 1304, it is declared that the PLMN cell passed to check the satisfaction of CS criteria fails to satisfy the CS criteria. The values of custom defined Srxlev and custom defined Squal are decided in such a way that if Srxlev and Squal of a PLMN cell is greater than custom defined Srxlev and custom defined Squal, then the PLMN cell provides a good service to the multi-SIM mobile device 102. So, in the multi-SIM mobile device 102, if the common suitable PLMN cell of both the protocol stacks satisfies the custom defined S criteria, then optimization of the power consumption is achieved by switching off one of the RF units. For example, if the multi-SIM mobile device 102 has camped on a PLMN Cell which has Srxlev and Squal greater than custom defined Srxlev and custom defined Squal then the multi-SIM mobile device 102 should be able to perform all sorts of incoming/outgoing activity without any degradation in quality.

The custom defined S Criteria (CS criteria) is added to make the multi-SIM mobile device 102 to select only the PLMN cells which can provide good service and at the same time optimization in power consumption could also be achieved. Hence, the CS criteria is defined to maintain the tradeoff between consumed power and service.

Figure 14:
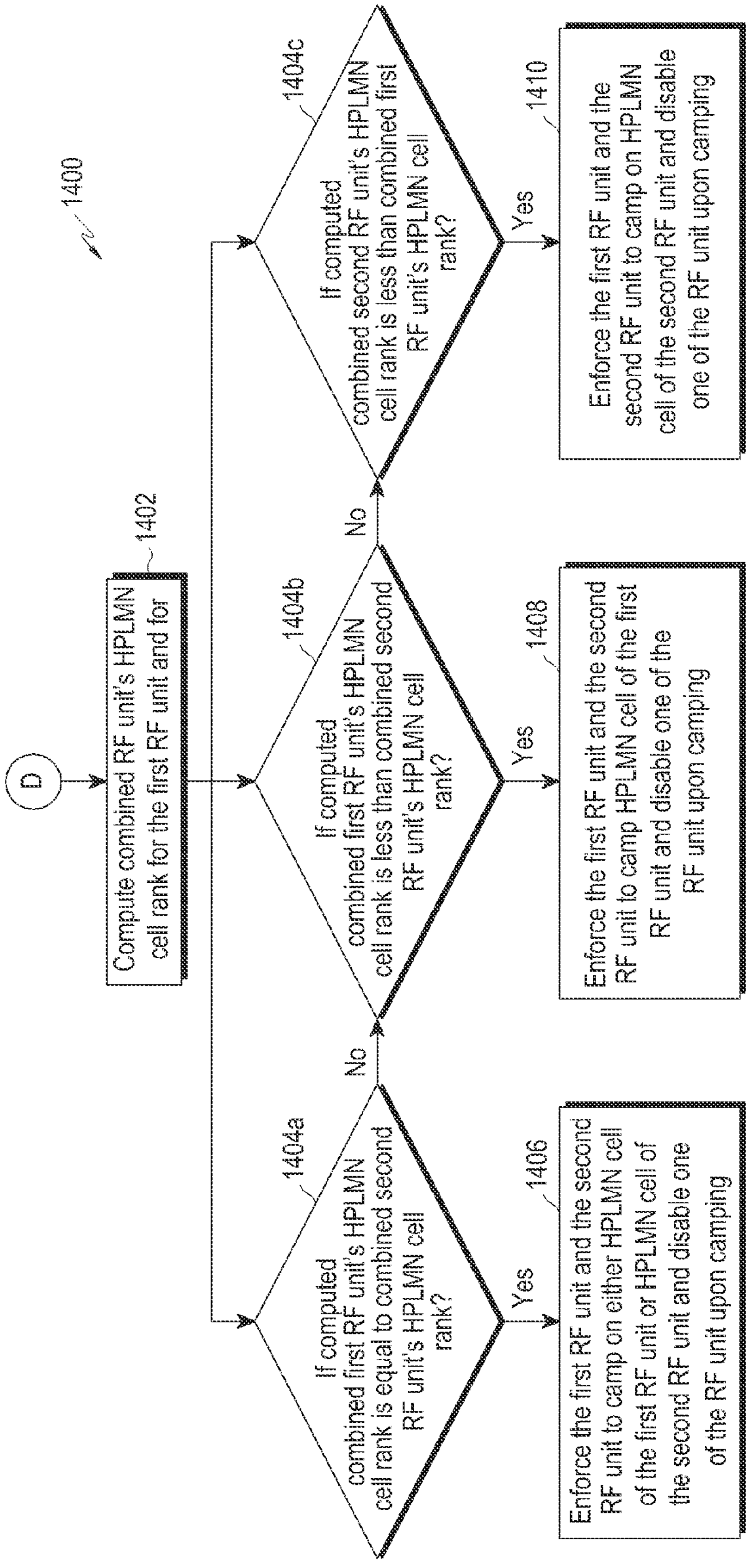
FIG. 14 is a process flowchart illustrating a method of enforcing at least one of the first RF unit and the second RF unit to camp on the common suitable PLMN cell, according to another embodiment as disclosed herein.

FIG. 14 is a flowchart illustrating a method of enforcing at least one of the first RF unit 106 and the second RF unit 108 to camp on the common suitable PLMN cell, according to another embodiment as disclosed herein. FIG. 14 corresponds to reference D. At step 1402, combined RF unit's HPLMN cell rank for first RF unit 106 and the second RF unit 108 are computed. For example, the combined first RF unit 106's HPLMN cell rank is computed by adding first RF unit 106's HPLMN cell rank in first list of PLMN cells to the first RF unit 106's HPLMN cell rank in second list of PLMN cells. Similarly, the combined second RF unit 108's HPLMN cell rank is computed by adding second RF unit 108's HPLMN cell rank in first list of PLMN cells to the second RF unit 108's HPLMN cell rank in second list of PLMN cells. Then, at step 1404*a*, it is determined whether computed first RF unit 106's HPLMN cell rank is equal to combined second RF unit 108's HPLMN cell rank. If it is determined that the computed first RF unit 106's HPLMN cell rank is equal to combined second RF unit 108's HPLMN cell rank, then at step 1406, first RF unit 106 and the second RF unit 108 are forced to camp on either HPLMN cell of first RF unit 106 or the HPLMN cell of the second RF unit 108 and the one of the RF unit is disabled upon camping on the common suitable PLMN cell. On the other hand, if it is determined that the computed first RF unit 106's HPLMN cell rank is not equal to combined second RF unit 108's HPLMN cell rank then at step 1404*b*, it is determined whether computed first RF unit 106's HPLMN cell rank is less than combined second RF unit 108's HPLMN cell rank. If it is determined that the computed first RF unit 106's HPLMN cell rank is less than combined second RF unit 108's HPLMN cell rank, then at step 1408, both the first RF unit 106 and the second RF unit 108 are forced to camp on the HPLMN cell of first RF unit 106 and one of the RF unit is disabled upon camping on the common suitable PLMN cell. On the other hand, if it is determined that the computed first RF unit 106's HPLMN cell rank is not less than combined second RF unit 108's HPLMN cell rank, then at step 1404*c* it is determined whether the computed second RF unit 108's HPLMN cell rank is less than combined first RF unit 106's HPLMN cell rank. If it is determined that the computed second RF unit 108's HPLMN cell rank is less than combined first RF unit 106's HPLMN cell rank, then at step 1410, both the first RF unit 106 and the second RF unit 108 are forced to camp on the HPLMN cell of second RF unit 108 and one of the RF unit is disabled upon camping on the common suitable PLMN cell.

Figure 15:
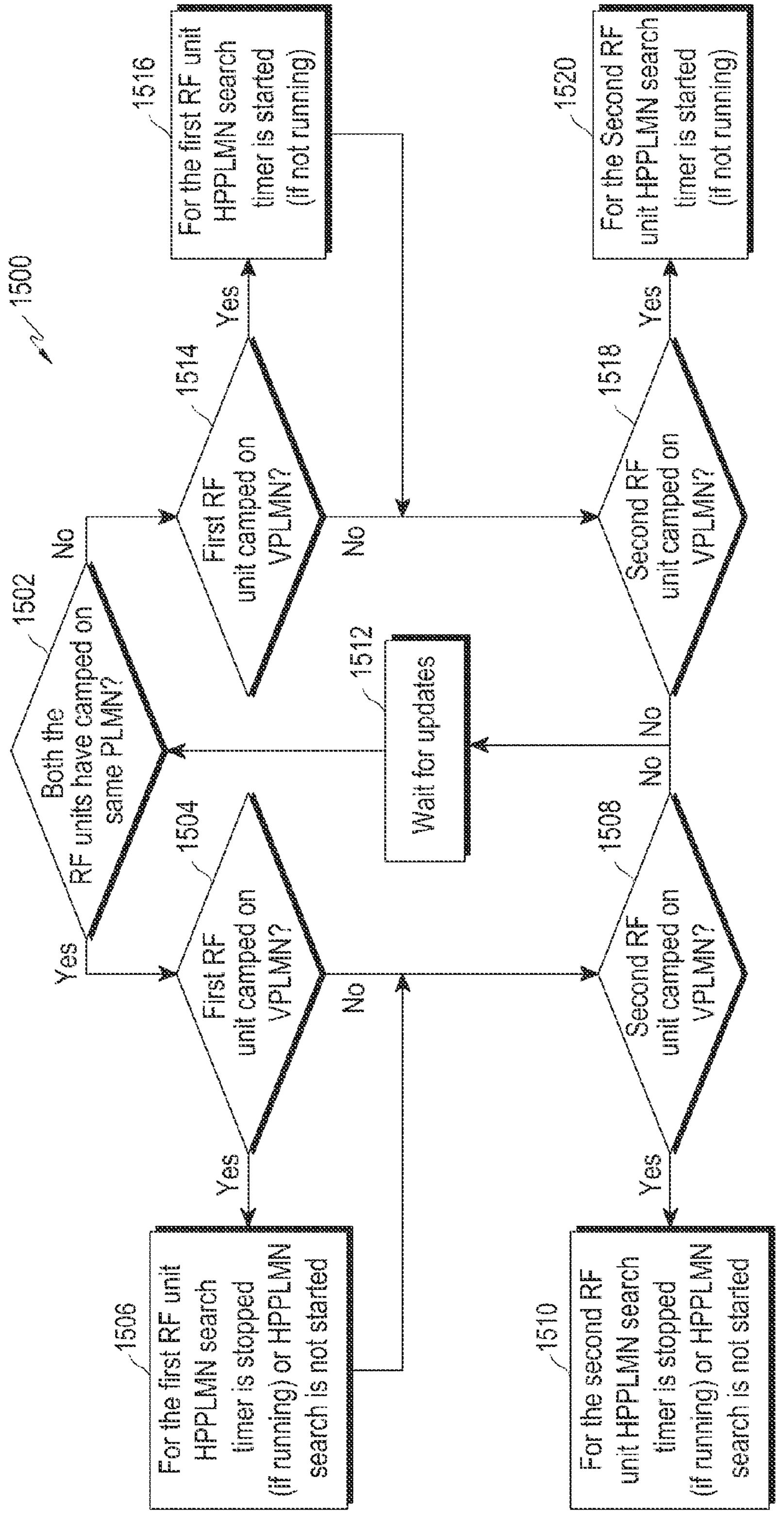
FIG. 15 is a flowchart illustrating a method of managing HPPLMN search timer, according to embodiments as disclosed herein.

FIG. 15 is a flowchart illustrating a method 1500 of managing HPPLMN search timer, according to embodiments as disclosed herein. At step 1502, it is determined whether both the RF units have camped on same PLMN. If it is determined that both the RF units have camped on same PLMN, then at step 1504, it is determined whether first RF unit 106 is camped on a VPLMN cell. If yes, then at step 1506, the HPPLMN search timer is stopped (if running) or is not started for the first RF unit 106. The process then goes to step 1508. On the other hand, if it is determined that the first RF unit 106 is not camped on the VPLMN cell, then at step 1508, it is determined whether the second RF unit 108 is camped on the VPLMN cell. If yes, then at step 1510, the HPPLMN search timer is stopped (if running) or is not started for the second RF unit 108. If not, then at step 1512, the SC module 304 waits for the updates and the process is transferred to step 1502.

Alternatively, if it is determined that both the RF units have not camped on same PLMN cell, then at step 1514, it is determined whether first RF unit 106 is camped on a VPLMN cell. If yes, then at step 1516, the HPPLMN search timer is started (if not running) for the first RF unit 106. The process then goes to step 1518. On the other hand, if it is determined that the first RF unit 106 is not camped on the VPLMN cell, then at step 1518, it is determined whether the second RF unit 108 is camped on the VPLMN cell. If yes, then at step 1520, the HPPLMN search timer is started (if not running) for the second RF unit 108. If not, then at step 1512, the SC module 304 waits for the updates and the process is transferred to step 1502.

Figure 16:
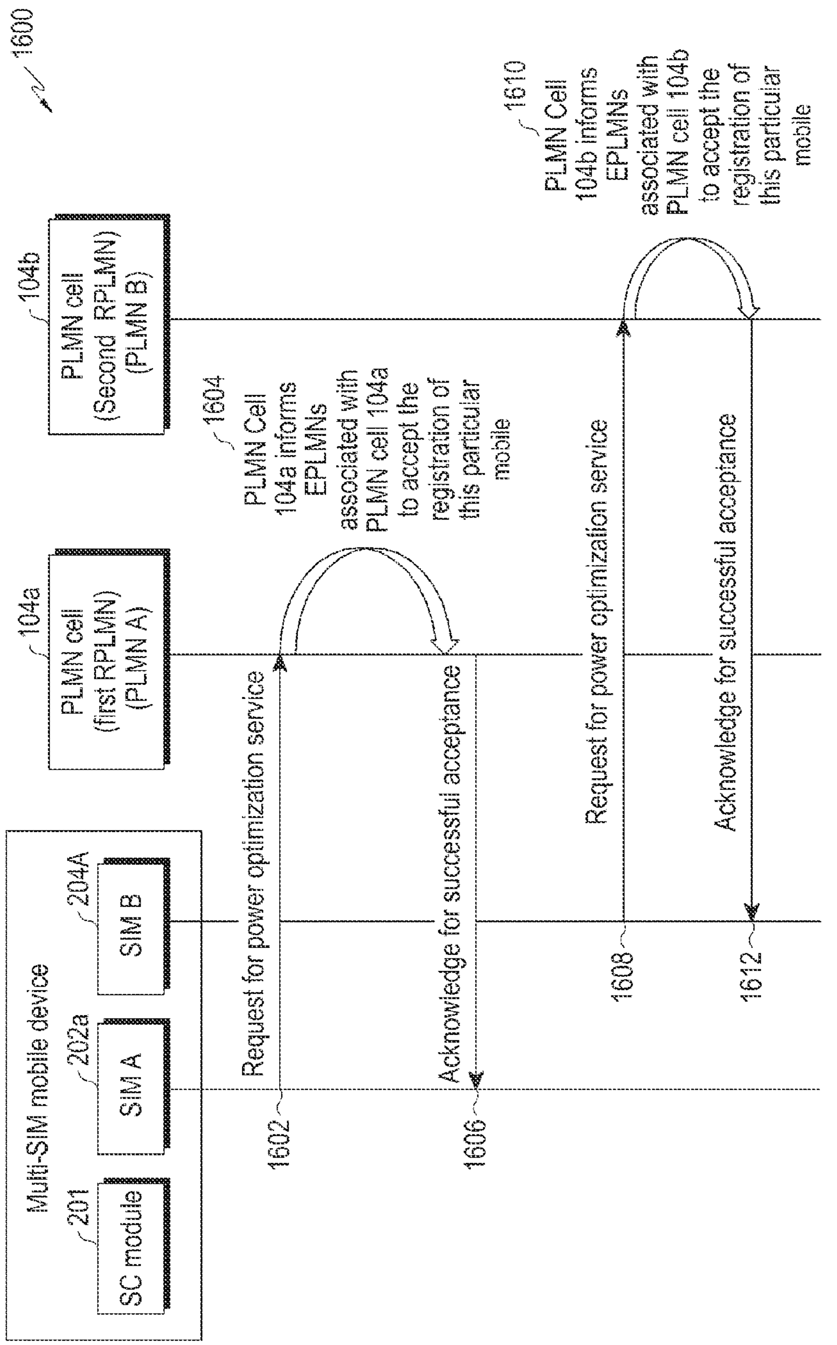
FIG. 16 is a signal flow diagram illustrating a process of activating power optimization service by the multi SIM mobile device, according to embodiments as disclosed herein.

FIG. 16 is a signal flow diagram illustrating an exemplary process of activating the subscription for power optimization service in the multi-SIM mobile device, according to embodiments as disclosed herein. Initially, the SIM A 202A of the multi-SIM mobile device 102 sends a request for obtaining power optimization service to the PLMN cell 104*a* (1602). Upon receiving the request, the PLMN 104*a* informs the EPLMNs associated with the PLMN cell 104*a* to accept the registration of this particular mobile device when the mobile device tries to register onto the EPLMNs of the PLMN cell 104*a* (1604). Then, the PLMN cell 104*a* sends an acknowledgement message confirming successful acceptance to the SIM A 202A of the multi-SIM mobile device 102 (1606).

Similarly, at step 1608, the SIM B 204A of the multi-SIM mobile device 102 sends a request for obtaining power optimization service to the PLMN cell 104*b*. Upon receiving the request, at step 1610, the PLMN cell 104*b* informs the EPLMNs associated with the PLMN cell 104*b* to accept the registration of this particular mobile device when the mobile device tries to register onto the EPLMNs of the PLMN 104*b*. Then at step 1612, the PLMN 104*b* sends an acknowledgement message confirming successful acceptance to the SIM B 204A of the multi-SIM mobile device 102.

Figure 17:
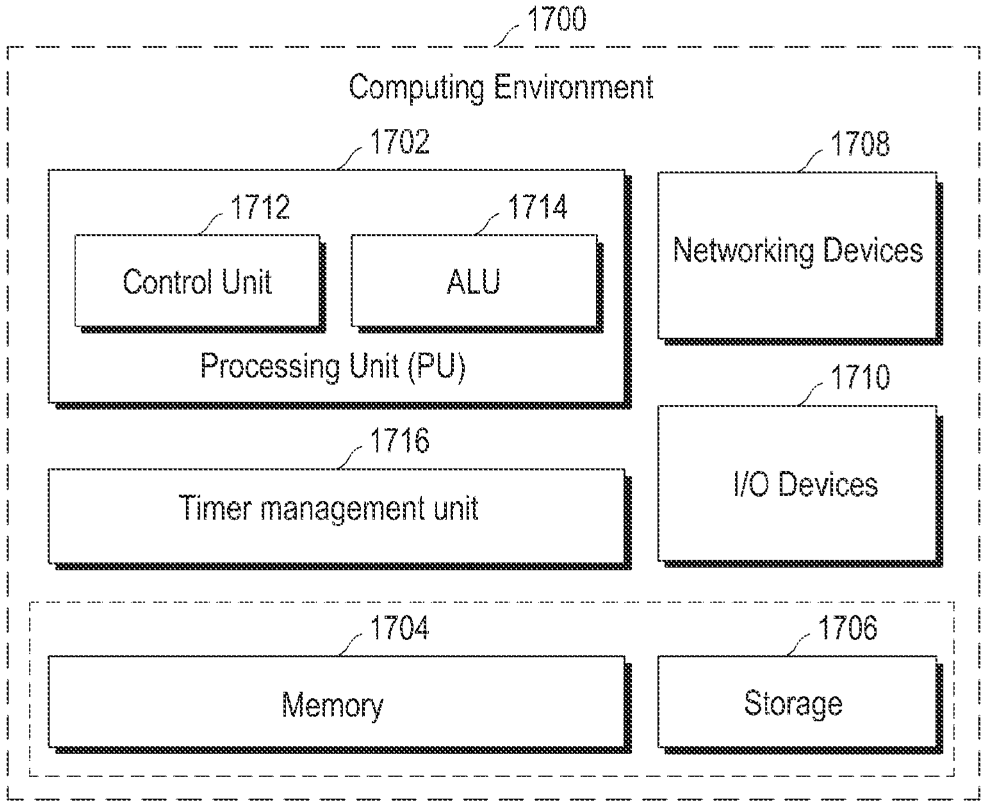
FIG. 17 is block diagram of a computing environment implementing a method for optimizing power consumption in multi-SIM active mobiles, according to embodiments as disclosed herein.

FIG. 17 is block diagram of a computing environment implementing a method for optimizing power consumption in multi-SIM active mobile, according to embodiments as disclosed herein. As depicted in the FIG. 17, the computing environment 1700 comprises at least one processing unit 1702 that is equipped with a control unit 1712 and an Arithmetic Logic Unit (ALU) 1714, a memory 1704, a storage unit 1706, plurality of networking devices 1708, plurality of Input output (I/O) devices 1710 and a timer management unit 1716.

The processing unit 1702 is responsible for processing the instructions of the algorithm. The processing unit 1702 receives commands from the control unit 1712 in order to perform its processing. Further, any logical and arithmetic operations involved in the execution of the instructions are computed with the help of the ALU 1714. The algorithm comprising of instructions and codes required for the implementation are stored in either the memory unit 1704 or the storage 1706 or both. At the time of execution, the instructions may be fetched from the corresponding memory 1704 and/or storage 1706, and executed by the processing unit 1702. The processing unit 1702, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processing unit 1702 may also include embedded controllers, such as generic or programmable logic devices or arrays, application specific integrated circuits, single-chip computers, smart cards, and the like.

The memory 1704 may be volatile memory and non-volatile memory. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like.

The timer management unit 1716 comprises of a high priority PLMN (HPPLMN) timer associated with each of the first RF unit 106 and the second RF unit 108 and a common suitable PLMN search timer. The timer management unit 1716 is configured for holding each of a high priority PLMN (HPPLMN) timer associated with each of the first RF unit 106 and the second RF unit 108 in an inactive mode when at least one of the first RF unit 106 and the second RF unit 108 are not camped on their respective HPLMN cells. Further, the timer management unit 1716 is configured for initiating each of the HPPLMN timer associated with each of the first RF unit 106 and the second RF unit 108 when the first RF unit 106 and the second RF unit 108 are not camped on same PLMN cell and when said common suitable PLMN cell is unavailable between the first RF unit 106 and the second RF unit 108. When both the RF units or either one of the RF units are forced to camp on its Equivalent PLMN (which is a VPLMN), then High priority PLMN search timer is not started in the corresponding RF unit (which has camped on VPLMN) to avail periodic searches for High priority PLMNs. This is made in order to make the corresponding RF unit to stay in VPLMN cell itself even though HPLMN is available, such that one of the RF unit remains switched off And the High priority PLMN Search timer (which was not started as mentioned above) is started for the RF unit which has not camped on its HPLMN, only when both the RF units gets camped on to different PLMNs due to unavailability of common PLMN cell.

The timer management unit 1716 is also configured for initiating the common suitable PLMN search timer upon determining that the first RF unit 106 and the second RF unit 108 are camped on different PLMN cells. Further, the timer management unit 1716 is configured for terminating the common suitable PLMN search timer in response to determining that the first RF unit 106 and said second RF unit 108 are camped on the common suitable PLMN cell.

Embodiments of the present subject matter may be implemented in conjunction with modules, including functions, procedures, data structures, and application programs, for performing tasks, or defining abstract data types or low-level hardware contexts. The Stack coordinator module 304 may be stored in the form of machine-readable instructions on any of the above-mentioned storage media and may be executed by the processing unit 1702. For example, a computer program may include machine-readable instructions, that when executed by the processing unit 1702, cause the processing unit 1702 to identify a common suitable-public land mobile network (PLMN) cell between a first radio frequency (RF) unit and a second RF unit 108 of the mobile device; enforce at least one of the first RF unit 106 and the second RF unit 108 to camp on the common suitable PLMN cell; disable one of the first RF unit 106 and the second RF unit 108 when at least one of the first RF unit 106 and the second RF unit 108 camps on the common suitable PLMN cell; and receive broadcast and paging information on at least one of the first RF unit 106 and the second RF unit 108 from the camped common suitable PLMN cell, according to the teachings and herein described embodiments of the present subject matter. In one embodiment, the computer program may be included on a compact disk-read only memory (CD-ROM) and loaded from the CD-ROM to a hard drive in the non-volatile memory.

In case of any hardware implementations various networking devices 1708 or external I/O devices 1710 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1-4 and 16 and 17 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for operating a multi-subscriber identity module (SIM) mobile device, the method comprising:

identifying an equivalent PLMN (EPLMN) cell as a common suitable public land mobile network (PLMN) cell between a first radio frequency (RF) unit and a second RF unit of said mobile device, wherein said first RF unit and said second RF unit of said mobile device are currently camped on different PLMN cells corresponding to different public land mobile networks (PLMNs) and said different PLMN cells comprises an equivalent PLMN (EPLMN) cell and a home PLMN (HPLMN) cell each corresponding to said first RF unit and said second RF unit respectively;

enforcing at least one of said first RF unit and said second RF unit to camp on said common suitable PLMN cell, even though said at least one of said first RF unit and said second RF unit is capable of camping on the HPLMN; and disabling one of said first RF unit and said second RF unit when at least one of said first RF unit and said second RF unit camps on said common suitable PLMN cell.

2. The method of claim 1, wherein said method further comprises receiving broadcast and paging information on at least one of said first RF unit and said second RF unit from said camped common suitable PLMN cell.

3. The method of claim 1, wherein said different PLMN cells corresponding to said different public land mobile networks (PLMNs) corresponds to a best suitable PLMN cell associated with said first RF unit and said second RF unit.

4. The method of claim 1, wherein said method further comprises:

holding each of a high priority PLMN (HPPLMN) search timer associated with each of said first RF unit and said second RF unit in an inactive mode when at least one of said first RF unit and said second RF unit are camped on said EPLMN cell.

5. The method of claim 4, wherein said method further comprises:

initiating each of said HPPLMN timer associated with each of said first RF unit and said second RF unit when said first RF unit and said second RF unit are camped on said different PLMN cells and when said common suitable PLMN cell is unavailable between said first RF unit and said second RF unit.

6. The method of claim 1, wherein identifying said common suitable PLMN cell between said first RF unit and said second RF unit of said mobile device comprises:

detecting an event at said mobile device;

determining whether a predefined condition is satisfied upon detecting the event at said mobile device;

selecting at least one of said first RF unit and said second RF unit to perform a PLMN search based on at least one state of said first RF unit and state of said second RF unit in response to determining that said predefined condition is satisfied upon detecting the event at said mobile device;

obtaining a list of cell information from the selected at least one of said first RF unit and said second RF unit, wherein said list of cell information corresponds to said first RF unit and said second RF unit;

creating a temporary list of PLMN cells corresponding to said first RF unit and said second RF unit based on said list of cell information; and storing said temporary list in said mobile device.

7. The method of claim 6, wherein said cell information comprises at least one of said available PLMN cell, available PLMN cell in stored cell selection information corresponding to at least one of said first RF unit and said second RF unit, cells of corresponding PLMNs, measurement information required for ranking PLMN cells, PLMN Identifiers (IDs) of said PLMN cells, neighbor cell information, and measurement information of camped PLMN cell.

8. The method of claim 6, wherein said method further comprises:

determining whether said temporary list comprises of said HPLMN cell of said first RF unit and said second RF unit and said neighbor cell information of said HPLMN cell of said first RF unit and said second RF unit;

requesting at least one of said first RF unit and said second RF unit to update said neighbor cell information of said HPLMN cell and said measurement information of corresponding neighbor cells for ranking along with said PLMN IDs of corresponding said neighbor cells; and updating said neighbor cell information of said HPLMN cell and said measurement information of corresponding said neighbor cells for ranking along with said PLMN IDs of corresponding said neighbor cells in said temporary list.

9. The method of claim 6, wherein said predefined condition comprises one of:

determining whether at least one said common EPLMN cell is available between said first RF unit and said second RF unit; and determining whether said HPLMN cell associated with one of said RF unit and said second RF unit is available in an EPLMN list of other one of said first RF unit and said second RF unit.

10. The method of claim 6, wherein determining whether said predefined condition is satisfied upon detecting the event at said mobile device comprises:

determining whether said first RF unit and said second RF unit are camped on said different PLMN cells;

initiating a common suitable PLMN search timer in response to determining that said first RF unit and said second RF unit are camped on said different PLMN cells; and requesting said first RF unit and said second RF unit to provide said neighbor cell information of corresponding registered PLMN (RPLMN) cell along with said measurement information required for ranking the cells and corresponding said PLMN ids of said PLMN cells upon expiry of said common suitable PLMN search timer; and storing said neighbor cell information of corresponding Registered PLMN (RPLMN) cell along with said cell information in said temporary list.

11. The method of claim 10, wherein determining whether said first RF unit and said second RF unit are camped on said different PLMN cells comprises:

terminating said common suitable PLMN search timer in response to determining that said first RF unit and said second RF unit are camped on said common suitable PLMN cell.

12. The method of claim 6, wherein said method further comprises:

receiving an update message from at least one of said first RF unit and said second RF unit, wherein the update message comprises of an updated cell information associated with at least one of said first RF unit and said second RF unit; and updating said temporary list based on received said update message.

13. The method of claim 6, wherein said event comprises one of:

powering on said mobile device and searching for one of respective HPLMN cell and said RPLMN cell or said first RF unit and said second RF unit triggers said PLMN search to recover from loss of coverage;

triggering said PLMN search for one of said respective HPLMN cell and said RPLMN cell by one of said first RF unit and said second RF unit, wherein one of said first RF unit and said second RF is in service;

triggering a blind search by said first RF unit and said second RF unit;

performing a reselection by said first RF unit and said second RF unit, wherein said first RF unit and said second RF unit are camped on said different PLMN cells; and performing said reselection when one of said first RF unit and said second RF unit is disabled, as both said first RF unit and said second RF unit are listening to same PLMN cell.

14. The method of claim 13, wherein said method further comprises:

detecting said event of powering on said mobile device and searching for one of said respective HPLMN cell and said RPLMN cell or said first RF unit and said second RF unit triggers said PLMN Search to recover from loss of coverage;

requesting one of said first RF unit and said second RF unit to perform said PLMN search for list of said PLMN cells available in said stored cell selection information of said first RF unit and second RF unit and to provide said measurement information of each said PLMN cells along with said cell information upon detecting said event;

receiving said measurement information of each said PLMN cells and said cell information from requested one of said first RF unit and said second RF unit; and creating said temporary list of PLMN cells and storing said measurement information of each said PLMN cells and said PLMN IDs of the corresponding said PLMN cells in said temporary list.

15. The method of claim 13, wherein said method further comprises:

detecting said event of triggering said PLMN search for one of said respective HPLMN cell and said RPLMN cell by one of said first RF unit and said second RF unit at said mobile device, wherein one of said first RF unit and said second RF is in service;

requesting one of said first RF unit and said second RF which is in service to perform said PLMN search for said list of PLMN cells which are available in said stored cell selection information for RF unit which is recovering from loss of coverage along with said cell information and said neighbor cell information of said camped PLMN cell of said RF unit which is in service from broadcasted system information upon detecting said event;

receiving said list of PLMN cells which are available in said stored cell selection information for said RF unit which is recovering from loss of coverage along with said cell information and said neighbor cell information of said camped PLMN cell of said RF unit which is in service from requested one of said first RF unit and said second RF which is in service;

storing said list of PLMN cells which are available in said stored cell selection information for said RF unit which is recovering from loss of coverage along with said cell information and said neighbor cell information of said camped PLMN cell of said RF unit which is in service, in said temporary list; and updating said temporary list with said list of PLMN cells which are available in said stored cell selection information for said RF unit which is recovering from loss of coverage along with said cell information and said neighbor cell information of said camped PLMN cell.

16. The method of claim 13, wherein said method further comprises:

detecting said event of performing said reselection by said first RF unit and said second RF unit at said mobile device, wherein said first RF unit and said second RF unit are camped on said different PLMN cells;

requesting said first RF unit and said second RF unit to provide said measurement information, said cell information and said neighbor cell information of camped RPLMN cell corresponding to said first RF unit and said second RF unit upon detecting said event; and storing said measurement information, said cell information and said neighbor cell information of said camped RPLMN cell corresponding to said first RF unit and said second RF unit in said temporary list.

17. The method of claim 13, wherein said method further comprises:

detecting said event of performing said reselection when said first RF unit is active and is camped on said common suitable PLMN cell and when said second RF unit is disabled at said mobile device;

determining whether camped cell measurements of said first RF unit which is active satisfies a custom defined S (CS) criteria;

monitoring camped cell signal condition without performing reselection for said first RF unit which is active in response to determining that said camped cell measurements of said first RF unit which is active satisfies said CS criteria;

updating in said mobile device with said camped PLMN cell of said first RF unit which is active as unsatisfying said CS criteria in response to determining that said CS criteria is unsatisfied by said camped cell measurements of said first RF unit which is active; and updating and storing said neighbor cell information of said camped PLMN cell along with said measurement information required for ranking said PLMN cells and said PLMN ids of said neighbor cells in said temporary list.

18. A multi-subscriber identity module (SIM) mobile device, the mobile device comprising:

a processor configured to:

identify an equivalent PLMN (EPLMN) cell as a common suitable public land mobile network (PLMN) cell between a first radio frequency (RF) unit and a second RF unit of said mobile device, wherein said first RF unit and said second RF unit of said mobile device are currently camped on different PLMN cells corresponding to different public land mobile networks (PLMNs) and said different PLMN cells comprises an equivalent PLMN (EPLMN) cell and a home PLMN (HPLMN) cell each corresponding to said first RF unit and said second RF unit respectively;

enforce at least one of said first RF unit and said second RF unit to camp on said common suitable PLMN cell, even though said at least one of said first RF unit and said second RF unit is capable of camping on the HPLMN; and disable one of said first RF unit and said second RF unit when at least one of said first RF unit and said second RF unit camps on said common suitable PLMN cell.

19. The device of claim 18, wherein said device further comprises:

a radio frequency (RF) unit configured to receive broadcast and paging information on at least one of said first RF unit and said second RF unit from said camped common suitable PLMN cell.

20. The device of claim 18, wherein said different PLMN cells corresponding to said different public land mobile networks (PLMNs) corresponds to a best suitable PLMN cell associated with said first RF unit and said second RF unit.

21. The device of claim 18, wherein said processor is further configured to hold each of said high priority PLMN (HPPLMN) search timer associated with each of said first RF unit and said second RF unit in an inactive mode when at least one of said first RF unit and said second RF unit are camped on said EPLMN cell.

22. The device of claim 21, wherein said processor is further configured to:

initiate each of said HPPLMN timer associated with each of said first RF unit and said second RF unit when said first RF unit and said second RF unit are camped on said different PLMN cells and when said common suitable PLMN cell is unavailable between said first RF unit and said second RF unit.

23. The device of claim 22, wherein in determining whether said predefined condition is satisfied upon detecting the event at said mobile device, said processor is further configured to:

determine whether said first RF unit and said second RF unit are camped on said different PLMN cells;

initiate a common suitable PLMN search timer in response to determining that said first RF unit and said second RF unit are camped on said different PLMN cells; and request said first RF unit and said second RF unit to provide said neighbor cell information of corresponding registered PLMN (RPLMN) cell along with said measurement information required for ranking the cells and corresponding said PLMN ids of said PLMN cells upon expiry of said common suitable PLMN search timer; and store said neighbor cell information of corresponding Registered PLMN (RPLMN) cell along with said cell information in said temporary list.

24. The device of claim 23, wherein in determining whether said first RF unit and said second RF unit are camped on said different PLMN cells, said processor is further configured to:

terminate said common suitable PLMN search timer in response to determining that said first RF unit and said second RF unit are camped on said common suitable PLMN cell.

25. The device of claim 18, wherein in identifying said common suitable PLMN cell between said first RF unit and said second RF unit of said mobile device, said processor is further configured to:

detect an event at said mobile device;

determine whether a predefined condition is satisfied upon detecting the event at said mobile device;

select at least one of said first RF unit and said second RF unit to perform a PLMN search based on at least one state of said first RF unit and state of said second RF unit in response to determining that said predefined condition is satisfied upon detecting the event at said mobile device;

obtain a list of cell information from the selected at least one of said first RF unit and said second RF unit, wherein said list of cell information corresponds to said first RF unit and said second RF unit;

create a temporary list of PLMN cells corresponding to said first RF unit and said second RF unit based on said list of cell information; and store said temporary list in said mobile device.

26. The device of claim 25, wherein said cell information comprises at least one of said available PLMN cell, available PLMN cell in stored cell selection information corresponding to at least one of said first RF unit and said second RF unit, cells of corresponding PLMNs, measurement information required for ranking PLMN cells, PLMN Identifiers (IDs) of said PLMN cells, neighbor cell information, and measurement information of camped PLMN cell.

27. The device of claim 25, wherein said processor is further configured to:

determine whether said temporary list comprises of said HPLMN cell of said first RF unit and said second RF unit and said neighbor cell information of said HPLMN cell of said first RF unit and said second RF unit;

request at least one of said first RF unit and said second RF unit to update said neighbor cell information of said HPLMN cell and said measurement information of corresponding neighbor cells for ranking along with said PLMN IDs of corresponding said neighbor cells; and update said neighbor cell information of said HPLMN cell and said measurement information of corresponding said neighbor cells for ranking along with said PLMN IDs of corresponding said neighbor cells in said temporary list.

28. The device of claim 25, wherein said predefined condition comprises one of:

determining whether at least one said common EPLMN cell is available between said first RF unit and said second RF unit; and determining whether said HPLMN cell associated with one of said RF unit and said second RF unit is available in an EPLMN list of other one of said first RF unit and said second RF unit.

29. The device of claim 25, wherein said processor is further configured to:

receive an update message from at least one of said first RF unit and said second RF unit, wherein the update message comprises of an updated cell information associated with at least one of said first RF unit and said second RF unit; and update said temporary list based on received said update message.

30. The device of claim 25, wherein said event comprises one of:

powering on said mobile device and searching for one of respective HPLMN cell and said RPLMN cell or said first RF unit and said second RF unit triggers said PLMN search to recover from loss of coverage;

triggering said PLMN search for one of said respective HPLMN cell and said RPLMN cell by one of said first RF unit and said second RF unit, wherein one of said first RF unit and said second RF is in service;

triggering a blind search by said first RF unit and said second RF unit;

performing a reselection by said first RF unit and said second RF unit, wherein said first RF unit and said second RF unit are camped on said different PLMN cells; and performing said reselection when one of said first RF unit and said second RF unit is disabled as said first RF unit and said second RF unit are listening to same PLMN cell.

31. The device of claim 30, wherein said processor is further configured to:

detect said event of powering on said mobile device and searching for one of said respective HPLMN cell and said RPLMN cell or both said first RF unit and said second RF unit triggers said PLMN Search to recover from loss of coverage;

request one of said first RF unit and said second RF unit to perform said PLMN search for list of said PLMN cells available in said stored cell selection information of said first RF unit and second RF unit and to provide said measurement information of each said PLMN cells along with said cell information upon detecting said event;

receive said measurement information of each said PLMN cells and said cell information from requested one of said first RF unit and said second RF unit; and create said temporary list of PLMN cells and storing said measurement information of each said PLMN cells and said PLMN IDs of the corresponding said PLMN cells in said temporary list.

32. The device of claim 30, wherein said processor is further configured to:

detect said event of triggering said PLMN search for one of said respective HPLMN cell and said RPLMN cell by one of said first RF unit and said second RF unit at said mobile device, wherein one of said first RF unit and said second RF is in service;

request one of said first RF unit and said second RF which is in service to perform said PLMN search for said list of PLMN cells which are available in said stored cell selection information for RF unit which is recovering from loss of coverage along with said cell information and said neighbor cell information of said camped PLMN cell of said RF unit which is in service from broadcasted system information upon detecting said event;

receive said list of PLMN cells which are available in said stored cell selection information for said RF unit which is recovering from loss of coverage along with said cell information and said neighbor cell information of said camped PLMN cell of said RF unit which is in service from requested one of said first RF unit and said second RF which is in service;

store said list of PLMN cells which are available in said stored cell selection information for said RF unit which is recovering from loss of coverage along with said cell information and said neighbor cell information of said camped PLMN cell of said RF unit which is in service, in said temporary list; and update said temporary list with said list of PLMN cells which are available in said stored cell selection information for said RF unit which is recovering from loss of coverage along with said cell information and said neighbor cell information of said camped PLMN cell.

33. The device of claim 30, wherein said processor is further configured to:

detect said event of performing said reselection by said first RF unit and said second RF unit at said mobile device, wherein said first RF unit and said second RF unit are camped on said different PLMN cells;

request said first RF unit and said second RF unit to provide said measurement information, said cell information and said neighbor cell information of camped RPLMN cell corresponding to said first RF unit and said second RF unit upon detecting said event; and store said measurement information, said cell information and said neighbor cell information of said camped RPLMN cell corresponding to said first RF unit and said second RF unit in said temporary list.

34. The device of claim 30, wherein said processor is further configured to:

detect said event of performing said reselection when said first RF unit is active and is camped on said common suitable PLMN cell and when said second RF unit is disabled at said mobile device;

determine whether camped cell measurements of said first RF unit which is active satisfies a custom defined S (CS) criteria;

monitor camped cell signal condition without performing reselection for said first RF unit which is active in response to determining that said camped cell measurements of said first RF unit which is active satisfies said CS criteria;

update in said mobile device with said camped PLMN cell of said first RF unit which is active as unsatisfying said CS criteria in response to determining that said CS criteria is unsatisfied by said camped cell measurements of said first RF unit which is active; and update and storing said neighbor cell information of said camped PLMN cell along with said measurement information required for ranking said PLMN cells and said PLMN ids of said neighbor cells in said temporary list.

35. The device of claim 18, wherein in enforcing at least one of said first RF unit and said second RF unit to camp on said common suitable PLMN cell, said processor is further configured to:

determine whether said best ranked PLMN cell for said first RF unit and said second RF unit are same; and enforce at least one of said first RF unit and said second RF unit to camp on said best ranked PLMN cell in response to determining that said best ranked PLMN cell for said first RF unit and said second RF unit are same.

36. The device of claim 35, wherein said processor is further configured to:

determine whether said respective HPLMN cell of said first RF unit and said second RF unit is available in said first list of PLMN cells and said second list of PLMN cells in response to determining that said best ranked PLMN cell for said first RF unit and said second RF unit are different;

compute a combined RF unit cell rank for said best ranked PLMN cell of said first RF unit and said best ranked PLMN cell of said second RF unit in response to determining that said respective HPLMN cell of said first RF unit and said second RF unit is available in said first list of PLMN cells and said second list of PLMN cells; and enforce at least one of said first RF unit and said second RF unit to camp on one of said best ranked PLMN cell of said first RF unit and said second RF unit based on said combined RF unit cell rank.

37. The device of claim 36, wherein in determining whether said respective HPLMN cell of one of said first RF unit and said second RF unit is available in said first list of PLMN cells and said second list of PLMN cells, said processor is further configured to:

determine whether one of said respective HPLMN cell associated with one of said first RF unit and said second RF unit is available in said first list of PLMN cells and said second list of PLMN cells; and enforce at least one of said first RF unit and said second RF unit to camp on one of said respective HPLMN cell which is available in said first list of PLMN cells and said second list of PLMN cells.

38. The device of claim 37, wherein said processor is further configured to:

determine whether at least one said common EPLMN cell is available in said first list of PLMN cells and said second list of PLMN cells in response to determining that one of said respective HPLMN cell associated with one of said first RF unit and said second RF unit is unavailable in said first list of PLMN cells and said second list of PLMN cells; and enforce at least one of said first RF unit and said second RF unit to camp on at least one said common EPLMN cell in response to determining that at least one said common EPLMN cell is available in said first list of PLMN cells and said second list of PLMN cells.

39. The device of claim 38, wherein said processor is further configured to:

add rank of said first list of PLMN cells to rank of said second list of PLMN cells for each of said common EPLMN cell in response to determining that more than one common EPLMN cells are available in said first list of PLMN cells and said second list of PLMN cells; and enforce at least one of said first RF unit and said second RF unit to camp on said common EPLMN cell based on the added rank.

* * * * *